US005492792A

United States Patent [19]
Tamura et al.

[11] Patent Number: 5,492,792
[45] Date of Patent: Feb. 20, 1996

[54] OPTICAL RECORDING MEDIUM USING A POLYMETHINE DYE

[75] Inventors: Miki Tamura, Isehara; Tsuyoshi Santoh, Yokohama; Chieko Mihara, Isehara, all of Japan

[73] Assignee: Canon Kabushiki Kaisha, Tokyo, Japan

[21] Appl. No.: 58,761

[22] Filed: May 10, 1993

[30] Foreign Application Priority Data

May 12, 1992 [JP] Japan .................................. 4-145045

[51] Int. Cl.$^6$ .............................. G11B 7/24; G11B 7/26
[52] U.S. Cl. ............................... 430/270.15; 430/945
[58] Field of Search .................................. 430/495, 945, 430/270; 369/288

[56] References Cited

U.S. PATENT DOCUMENTS

| | | | |
|---|---|---|---|
| 4,547,444 | 10/1985 | Bell et al. | 430/11 |
| 4,944,981 | 7/1990 | Oguchi et al. | 428/64 |
| 5,079,127 | 1/1992 | Katagiri et al. | 430/269 |
| 5,120,858 | 6/1992 | Sandefur et al. | 548/455 |
| 5,178,995 | 1/1993 | Fukui et al. | 430/495 |
| 5,271,979 | 12/1993 | Santoh et al. | 428/64 |
| 5,276,163 | 1/1994 | Inagaki et al. | 548/302.4 |

FOREIGN PATENT DOCUMENTS

| | | | |
|---|---|---|---|
| 1-229694 | 9/1989 | Japan | 430/495 |

OTHER PUBLICATIONS

Bartolini et al., Optical Engineering, "Review and Analysis of Optical Recording Media", vol. 15, No. 2 (1976), pp. 99–108.
Tuemmler, et al., Journ. of the American Chemical Society, "Polymethine Dyes I. A Comparison of Several Vinylogous Series . . . ", vol. LXXX, (Jul.–Sep. 1958). pp. 3772–3777.
Schmidt, et al., Annalen Der Chemie, "Über Die Vinylenhomologen Der Di–Und Triphenylmethanfarbstoffe, III", vol. 623 (1959), pp. 204–216.
Wizinger, et al., Helv. Chim. Acta, "Über die Vinylenhomologen der Triphenylmethanfarbstoffe", vol. XXIV (1941), pp. 369–388.

*Primary Examiner*—Charles L. Bowers, Jr.
*Assistant Examiner*—John A. McPherson
*Attorney, Agent, or Firm*—Fitzpatrick, Cella, Harper & Scinto

[57] ABSTRACT

An optical recording medium of the present invention has a recording layer containing an organic coloring matter expressed by the following formula (I) or (II):

$$R_0\text{-}N(R_1)\text{-}C_6H_4\text{-}C(R_4)=CH\text{-}(CH=CH)_m\text{-}C(R_5)\text{-}C_6H_4\text{-}N(R_2)(R_3) \quad X^{\ominus} \quad (I)$$

wherein $R_0$ through $R_5$ each indicate a hydrogen atom or an monovalent organic residue, at least one of $R_0$ through $R_3$ being a fluorine-containing monovalent organic residue; m indicates 0, 1 or 2; and $X^{\ominus}$ indicates an anion residue.

$$R_0'\text{-}N(R_1')\text{-}C_6H_4\text{-}C(R_4')=CH\text{-}(CH=CH)_m\text{-}C(R_5')\text{-}C_6H_4\text{-}N(R_2')(R_3') \quad X^{\ominus} \quad (II)$$

wherein $X^{\ominus}$ indicates an anion residue; m indicates 0, 1 or 2; and $R_{0'}$ and $R_{3'}$ are atoms forming combinations of $R_{0'}$ and $R_{1'}$, and $R_{2'}$, and $R_{3'}$ at least one of which forms, with a nitrogen atom, a fluorine-containing substituted or unsubstituted pyrrolidine ring, a fluorine-containing substituted or unsubstituted piperidine ring, a fluorine-containing substituted or unsubstituted morpholine ring, a fluorine-containing substituted or unsubstituted tetrahydropyridine ring, a fluorine-containing substituted or unsubstituted cyclohexylamine ring expressed by the formula $$-N\!\!\left\langle\!\!\begin{array}{c}\\ \\ \end{array}\!\!\right\rangle$$

and the other substituents each being a hydrogen atom or a monovalent organic residue; and $R_4$, and $R_5$, each indicate a hydrogen atom or a monovalent organic residue.

16 Claims, 1 Drawing Sheet

OPTICAL RECORDING MEDIUM USING A POLYMETHINE DYE

BACKGROUND OF THE INVENTION

1. Field of the Invention

The present invention relates to an optical recording medium and to a record blank suitable for recording information with a laser beam, particularly, a semiconductor laser beam. It also relates an information record allowing optical reproduction of information recorded by a laser beam.

2. Description of the Related Art

Generally, information can be recorded on an optical recording medium, such as a series of optical discs or optical cards, by forming optically detectable minute pits: (for example, of approximately 1 μm) arranged in such a manner as to define a spiral, concentric or linear track on a recording layer formed on a substrate of the recording medium, thereby making it possible to store information at high-density.

As described, for example, in "Review and Analysis of Optical Recording Media" Optical Engineering, Vol. 15, No. 2, March-April 1976, pp99–108, a known optical recording method consists in applying a light beam, such as a laser beam, to the recording layer of an optical recording medium so as to generate deformation or pits on the recording layer. In other known methods, the application of such a light beam causes the generation of bubbles, changes in phase, discoloration or the like.

Various materials have been proposed for the recording layer of such an optical recording medium. Examples of such materials include inorganic materials, such as a metal film consisting of an aluminum deposit film, a bismuth film, a tellurium oxide film, or a chalcogenite-type non-crystalline glass film. Generally, such thin films are sensitive to light having a wavelength of approximately 350 to 800 nm and exhibit high reflectance to laser beams. One disadvantage of these films is that they provide a rather poor laser-beam-utilization factor. Further, such an inorganic material thin film is usually formed as a recording layer by sputtering. Such a film formation method, however, requires a production line equipped with a vacuum system, so that these inorganic material thin films have higher production costs.

In view of the above problems, optical recording mediums using organic coloring matter whose optical properties can be changed by the energy of light having a relatively long wavelength (for example, 780 nm or more) are being carefully studied. Optical recording mediums using such organic coloring matter are effective in that they allow the formation of pits by a semiconductor laser having an oscillation wavelength of around 780 nm or 830 nm. Moreover, organic coloring matter allows film formation by wet coating and can be easily treated, making it possible to easily mass-produce recording mediums on less expensive equipment.

The applicant of this invention discloses, in U.S. Pat. Nos. 4,944,981 and 5,079,127, polymethine dyes which permit recording by a semiconductor laser at a high S/N ratio and which provide an optical recording medium having good thermal stability.

In recent years, however, a decrease in the size of a record/reproduction device causes a higher temperature in the device. Personal portable optical recording media such as optical cards and the like, which have recently been developed, are not necessarily used in an office equipped with air-conditioning equipment. It is thus necessary to consider the situation where an optical recording medium is allowed to stand in a high-temperature environment for a long time. There is, therefore a need for an optical recording medium exhibiting greater stability in a high-temperature environment.

SUMMARY OF THE INVENTION

Accordingly, the present invention has been achieved in consideration of the above present condition. An object of the present invention is to provide an optical recording medium having excellent sensitivity to light within the near infrared region and greater heat resistance.

Another object of the present invention is to provide a method of producing with good productivity an optical recording medium having high recording sensitivity and excellent heat resistance.

In order to achieve these objects, an optical recording medium of the present invention comprises a recording layer containing an organic dye expressed by the following formula (I):

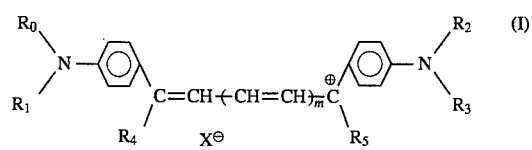

wherein $R_0$ through $R_5$ each indicate a hydrogen atom or a monovalent organic residue, at least one of $R_0$ through $R_3$ being a monovalent organic residue having a fluorine atom; m is 0, 1 or 2; and $X^\ominus$ indicates an anion residue.

In another aspect of the present invention, there is provided an optical recording medium comprising a recording layer containing a polymethine dye expressed by the following formula (II):

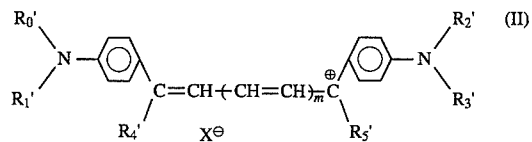

wherein $X^\ominus$ indicates an anion residue, $R_0'$ through $R_3'$ indicate atoms that when taken together in combinations of $R_0'$ and $R_1'$, and $R_2'$ and $R_3'$, with a nitrogen atom, at least one of the combinations forms a substituted or unsubstituted fluorine-containing pyrrolidine ring, a substituted or unsubstituted fluorine-containing piperidine ring, a substituted or unsubstituted fluorine-containing morpholine ring, a substituted or unsubstituted fluorine-containing tetrahydropyridine ring, or a substituted or unsubstituted fluorine-containing cyclohexylamine ring expressed by the formula,

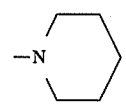

and the other substituents each being a hydrogen atom or a monovalent organic residue; $R_4'$ and $R_5'$ each indicate a hydrogen atom or a monovalent organic residue; and m indicates 0, 1 or 2.

In a further aspect of the present invention, there is provided a method of producing an optical recording medium comprising a recording layer containing an organic dye expressed by the formula (I) shown below, the method comprising forming the recording layer by coating a solution containing the organic dye expressed by the formula (I) on a substrate.

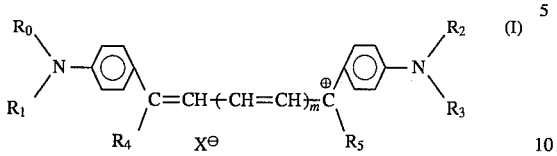

wherein each of $R_0$ through $R_5$ is a hydrogen atom or a monovalent organic residue, at least one of $R_0$ through $R_3$ being a monovalent organic residue having a fluorine atom; m is 0, 1 or 2; and $X^\ominus$ indicates an anion residue.

In a still further aspect of the present invention, there is provided a method of producing an optical recording medium comprising a recording layer containing an organic dye expressed by the formula (II) shown below, the method comprising forming the recording layer by coating a solution containing the organic dye expressed by the formula (II) on a substrate.

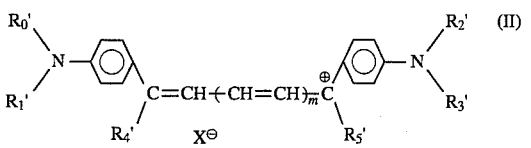

wherein $X^\ominus$ indicates an anion residue, $R_0'$ through $R_3'$ indicate atoms that when taken together in combinations of $R_0'$ and $R_1'$ and $R_2'$ and $R_3'$, with a nitrogen atom, at least one of the combinations forms a substituted or unsubstituted fluorine-containing pyrrolidine ring, a substituted or unsubstituted fluorine-containing piperidine ring, a substituted or unsubstituted fluorine-containing morpholine ring, a substituted or unsubstituted fluorine-containing tetrahydropyridine ring, or a substituted or unsubstituted fluorine-containing cyclohexylamine ring expressed by the formula,

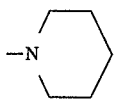

and the other substituents each being a hydrogen atom or a monovalent organic residue; $R_4'$ and $R_5'$ each indicate a hydrogen atom or a monovalent organic residue; and m indicates 0, 1 or 2.

DETAILED DESCRIPTION OF THE INVENTION

Figure 1:
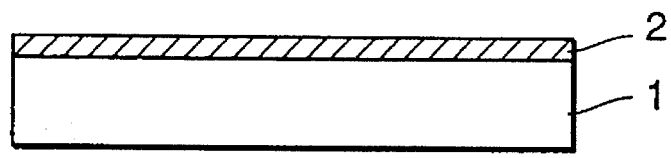
FIG. 1 is a schematic sectional view of an optical recording medium in accordance with an embodiment of the present invent ion.

The present invention is described in detail below. An optical recording medium of the present invention comprises a polymethine dye expressed by the following formula (I):

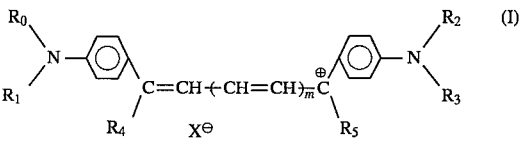

wherein $R_0$ through $R_5$ each indicate a hydrogen atom or a monovalent organic residue. In the present invention, at least one of the substituents $R_0$ through $R_3$ is preferably a monovalent organic residue (referred to as "$R_F$" hereinafter) having a fluorine atom. When at least one of the substituents $R_0$ through $R_3$ is $R_F$, a polymethine dye having better heat resistance than that of conventional dyes can be obtained. An optical recording medium exhibiting excellent heat resistance can be obtained by having such a polymethine dye in the recording layer.

Preferred examples of $R_F$ that can be used as the substituents $R_0$ through $R_3$ in the present invention include a substituted or unsubstituted fluorine-containing alkyl group, a substituted or unsubstituted fluorine-containing alkenyl group, a substituted or unsubstituted fluorine-containing aralkyl group, a substituted or unsubstituted fluorine-containing aryl group.

The organic residue $R_F$ is described below. For example, "unsubstituted fluorine-containing aryl group" represents that at least one of the hydrogen atoms of a phenyl group is substituted by a fluorine atom, and that the hydrogen atoms of a phenyl group are not substituted by other elements or organic residues.

"substituted fluorine-containing aryl group", for example, represents that at least one of the hydrogen atoms of a phenyl group is substituted by a fluorine atom, and at least one of the hydrogen atoms is substituted by another element or monovalent organic residue, or that at least one of the hydrogen atoms of a phenyl group is substituted by a monovalent organic residue having a fluorine atom.

The organic residue $R_F$ is described in further detail below.

Examples of unsubstituted fluorine-containing alkyl groups include fluoromethyl, difluoromethyl, trifluoromethyl, 1-fluoroethyl, 2-fluoroethyl, 1,1-difluoroethyl, 1,2-difluoroethyl, 2,2-difluoroethyl, 1,1,1-trifluoroethyl, 1,1,2-trifluoroethyl, 1,2,2-trifluoroethyl, 1,1,2,2-tetrafluoroethyl, 1,1,1,2-tetrafluoroethyl, pentafluoroethyl, 1-fluoropropyl, 2-fluoropropyl, 3-fluoropropyl, 1,1-difluoropropyl, 1,2-difluoropropyl, 1,3-difluoropropyl, 2,2-difluoropropyl, 2,3-difluoropropyl, 3,3-difluoropropyl, 1,1,2-trifluoropropyl, 1,1,3-trifluoropropyl, 1,2,2-trifluoropropyl, 1,2,3-trifluoropropyl, 1,3,3-trifluoropropyl, 2,2,3-trifluoropropyl, 3,3,3-trifluoropropyl, 1,1,2,2-tetrafluoropropyl, 1,1,3,3-tetrafluoropropyl, 1,1,2,3-tetrafluoropropyl, 1,2,2,3-tetrafluoropropyl, 1,2,3,3-tetrafluoropropyl, 2,2,3,3-tetrafluoropropyl, 1,3,3,3-tetrafluoropropyl, 2,3,3,3-tetrafluoropropyl, 1,1,2,2,3-pentafluoropropyl, 1,1,2,3,3-pentafluoropropyl, 1,1,3,3,3-pentafluoropropyl, 1,2,2,3,3-pentafluoropropyl, 1,2,3,3,3-pentafluoropropyl, 2,2,3,3,3-pentafluoropropyl, 1,1,2,2,3,3-hexafluoropropyl, 1,1,2,3,3,3-hexafluoropropyl, 1,2,2,3,3,3-hexafluoropropyl, heptafluoropropyl, 1,1,1,3,3,3-hexafluoro- 2-propyl, heptafluoro-2-propyl, 2,2-difluorobutyl, 2,2,3,3-tetrafluorobutyl, 4,4,4-trifluorobutyl, 3,3,4,4,4-pentafluorobutyl, 2,2,4,4,4-pentafluorobutyl, 2,2,3,4,4,4-hexafluorobutyl, 1,2,3,4-tetrafluorobutyl, nonafluorobutyl, 2,2,3,3,4,4,4-heptafluoro-2-butyl, t-nonafluorobutyl, 5,5,5-trifluoropentyl, 4,4,5,5,5-pentafluoropentyl, 3,3,5,5-pentafluoropentyl, 3,3,4,4-tetrafluoropentyl, 1,2,3,4,5-pentafluoropentyl, 2,2,3,3,4,4,5,5-octafluoropentyl, 6,6,6- trifluorohexyl, 6,6,7,7,7-pentafluoropentyl, 8,8,8-trifluorooctyl, and 5,5,6,6,7,7,8,8-octafluorooctyl groups and the like.

Examples of other fluorine-containing alkyl groups, e.g., fluorine-containing substituted alkyl groups, include fluorine-containing hydroxyalkyl groups such as 2-hydroxy-2-fluoroethyl, 2-hydroxy-1,1-difluoroethyl, and 3-hydroxy-2,2-difluoropropyl groups and the like; fluorine-containing acetoxyalkyl groups such as 2-acetoxy-2-fluoroethyl, 2-acetoxy- 2,2-difluoroethyl, and 3-acetoxy-2,2,3,3-tetrafluoropropyl groups and the like; fluorine-containing carboxyalkyl groups such as 2-carboxy-1,2-difluoroethyl, 3-carboxy-3-fluoropropyl, and 4-carboxy-2,2-difluorobutyl groups and the like; fluorine-containing alkoxyalkyl groups such as trifluoromethoxymethyl, trifluoromethoxyethyl, trifluoromethoxy-2-difluoroethyl, difluoromethoxyethyl, 2-trifluoroethoxy- 2'-difluoroethyl, trifluoromethoxy-n-propyl, pentafluoroethoxyethyl, pentafluoroethoxypropyl, methoxy-3,3-difluoropropyl, and trifluoromethoxyaotyl groups and the like.

Examples of fluorine-containing unsubstituted alkenyl groups include trifluoroethylene, 2,2-difluoroethylene, pentafluoropropenyl, pentafluorobutenyl groups and the like.

Examples of fluorine-containing substituted alkenyl groups include a 2-hydroxy-3,3-difluoropropenyl group and the like.

Examples of fluorine-containing unsubstituted aralkyl groups include p-fluorobenzyl, m-fluorobenzyl, pentafluorobenzyl, p-trifluoromethylbenzyl, 1-(pentafluorophenyl)ethyl, and 3-(pentafluorophenyl)propyl groups and the like.

Examples of fluorine-containing substituted aralkyl groups include a 4-hydroxy-3-fluorobenzyl group and the like.

Examples of fluorine-containing unsubstituted aryl groups include p-fluorophenyl, and pentafluorophenyl groups and the like.

Examples of fluorine-containing substituted aryl groups include p-trifluoromethylphenyl, and 3,5-bis(trifluoromethyl) phenyl groups and the like.

In the present invention, it is preferred in order to improve the heat resistance of the optical recording medium that at least one of the substituents $R_0$ through $R_3$ of an organic dye expressed by the formula (I) is $R_F$, as described above.

Specifically, the polymethine dye in which at least one of $R_0$ and $R_1$ and at least one of $R_2$ and $R_3$ are $R_F$, or all the substituents $R_0$ through $R_3$ are $R_F$, is preferred for mass-producing optical recording media with excellent heat resistance because the heat resistance of the optical recording media and the solubility of the dye are improved.

The substituents $R_0$ through $R_3$ other than the substituent $R_F$ may be a hydrogen atom or a monovalent organic residue other than $R_F$. Examples of monovalent 5 organic residues other than $R_F$ include alkyl groups such as methyl, ethyl, n-propyl, isopropyl, n-butyl, isobutyl, t-butyl, n-amyl, t-amyl, n-hexyl, n-octyl, and t-octyl groups and the like; substituted alkyl groups such as hydroxyalkyl groups such as 2-hydroxyethyl, 3-hydroxypropyl, 4-hydroxybutyl groups and the like, acetoxyalkyl groups such as 2-acetoxyethyl and 2-acetoxypropyl groups and the like, carboxyalkyl groups such as carboxymethyl, 2-carboxyethyl, and 3-carboxypropyl groups and the like; alkoxyalkyl groups such as methoxymethyl, methoxyethyl, methoxypropyl, methoxybutyl, ethoxymethyl, ethoxyethyl, ethoxypropyl, ethoxybutyl, propoxymethyl groups and the like; aralkyl groups such as benzyl, p-chlorobenzyl, p-methylbenzyl, 2-phenylmethyl, 2-phenylpropyl, 3-phenylpropyl, α-naphthylmethyl and β-naphthylethyl groups and the like; substituted or unsubstituted aryl groups such as phenyl, naphthyl, tolyl, xylyl, methoxyphenyl, dimethoxyphenyl, trimethoxyphenyl, ethoxyphenyl, dimethylaminophenyl, diethylaminophenyl, dipropylaminophenyl, dibenzylaminophenyl, diphenylaminophenyl, and ditolylaminophenyl groups and the like.

When at least two of the substituents $R_0$ through $R_3$ are $R_F$, the organic residues $R_F$ may be either the same or different.

In addition, it is preferred for mass-producing optical recording media having excellent heat resistance that if the number of carbon atoms of $R_F$ is n, the number of fluorine atoms of $R_F$ is 0.1 n to 3 n, more preferably 0.5 n to 1.8 n, because the heat resistance of the optical recording media and the solubility of the dye in organic solvents can, thereby, be improved.

Of the above-described various examples of $R_F$, fluorine-containing substituted or unsubstituted alkyl groups are preferred as the organic residues having the effect of improving the heat resistance of optical recording media and improving the solubility of the organic dye in organic solvents. In this case, an alkyl group preferably has 1 to 8 carbon atoms, more preferably 1 to 5 carbon atoms.

$R_4$ and $R_5$ each indicate a hydrogen atom or a monovalent organic residue including $R_F$. Any one of the above fluorine-containing monovalent organic residues can be used as $R_F$. Examples of monovalent organic residues other than $R_F$ include substituted or unsubstituted alkyl groups; substituted or unsubstituted aralkyl groups; substituted or unsubstituted aryl groups such as phenyl, naphthyl, tolyl, xylyl, methoxyphenyl, dimethoxyphenyl, trimethoxyphenyl, ethoxyphenyl, dimethylaminophenyl, diethylaminophenyl, dipropylaminophenyl, dibenzylaminophenyl, diphenylaminophenyl, and ditolylaminophenyl groups and the like; substituted or unsubstituted heterocyclic groups such as pyridyl, quinolyl, lepidyl, methylpyridyl, furyl, thienyl, indolyl, pyrrole, carbazolyl, and N-ethylcarbazolyl groups and the like; substituted or unsubstituted styryl groups such as styryl, methoxystyryl, dimethoxystyryl, trimethoxystyryl, trimethoxystyryl, ethoxystyryl, dimethylaminostyryl, diethylaminostyryl, dipropylaminostyryl, dibenzylaminostyryl, diphenylaminostyryl, 2,2-diphenylvinyl, 2-phenyl-2methylvinyl, 2-(dimethylaminophenyl)-2-phenylvinyl, 2(diethylaminophenyl)-2-phenylvinyl, 2-(dibenzylaminophenyl)- 2-phenylvinyl, 2,2-di(diethylaminophenyl) vinyl, 2,2-di(methoxyphenyl)vinyl, 2,2-(ethoxyphenyl)vinyl, 2-(dimethylaminophenyl)- 2-methylvinyl, and 2-(diethylaminophenyl)- 2-ethylvinyl groups and the like.

At least one of $R_4$ and $R_5$ may be a fluorine-containing amino-substituted aryl group expressed by the following formula (III):

(III)

wherein $R_6$ and $R_7$ are each a hydrogen atom or a monovalent organic residue, and at least one of $R_6$ and $R_7$ is $R_F$.

However, it is preferred in view of the heat resistance of the optical recording medium and the mass productivity thereof by wet-coating of a recording layer that $R_4$ and $R_5$ are each a monovalent organic residue other than $R_F$, and at least one of $R_4$ and $R_5$ is a substituted or unsubstituted aryl group. When at least one of $R_4$ and $R_5$ is $R_F$, it is preferred that at least one, particularly both, of $R_6$ and $R_7$ of the amino-substituted aryl group expressed by the formula (III) is a substituted or unsubstituted fluorine-containing methyl or ethyl group.

Namely, when the polymethine dye compound in which $R_4$ and $R_5$ are monovalent organic residues other than $R_F$ or the fluorine-containing aryl group described above is used in the recording layer, an optical recording medium having excellent heat resistance can be obtained, and the mass productivity of an optical recording medium of high quality exhibiting a low noise level can be improved due to the excellent solvent solubility of the compound.

A second optical recording medium of the present invention is characterized by containing a polymethine dye expressed by the following formula (II):

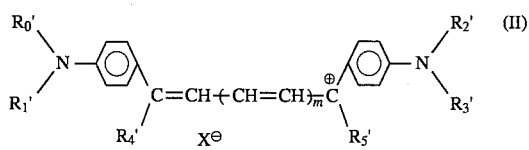

In the formula (II), at least one of combinations of $R_{0'}$ and $R_{1'}$, and $R_{2'}$ and $R_{3'}$ of substituents $R_{0'}$ through $R_{3'}$ has atoms required for forming with a nitrogen atom, a substituted or unsubstituted fluorine-containing pyrrolidine ring, a substituted or unsubstituted fluorine-containing piperidine ring, a substituted or unsubstituted fluorine-containing morpholine ring, a substituted or unsubstituted fluorine-containing tetrahydropyridine ring, or a substituted or unsubstituted fluorine-containing cyclohexylamine ring expressed by the following formula.

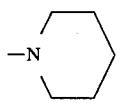

The polymethine dye exhibits excellent heat resistance. Although the substituents $R_{0'}$ through $R_{3'}$ other than the substituents forming a ring are preferably $R_F$ in view of the increased heat resistance of the polymethine dye, the substituents may each be a hydrogen atom or a monovalent organic residue other than $R_F$.

Examples of the $R_F$ can be used described above, and examples of monovalent organic residues other than $R_F$ include alkyl groups such as methyl, ethyl, n-propyl, isopropyl, n-butyl, isobutyl, t-butyl, n-amyl, t-amyl, n-hexyl, n-octyl, and t-octyl groups and the like; substituted alkyl groups such as hydroxyalkyl groups such as 2-hydroxybutyl, 3-hydroxypropyl, 4-hydroxybutyl groups and the like, acetoxyalkyl groups such as 2-acetoxyethyl and 2-acetoxypropyl groups and the like, carboxyalkyl groups such as carboxymethyl, 2-carboxyethyl and 3-carboxypropyl groups and the like, alkoxyalkyl groups such as methoxymethyl, methoxyethyl, methoxypropyl, methoxybutyl, ethoxymethyl, ethoxyethyl, ethoxypropyl, ethoxybutyl, and propoxymethyl groups and the like; aralkyl groups such as benzyl, p-chlorobenzyl, p-methylbenzyl, 2-phenylmethyl, 2-phenylpropyl, 3-phenylpropyl, α-naphthylmethyl, β-naphthylethyl groups and the like; substituted or unsubstituted aryl groups such as phenyl, naphthyl, tolyl, xylyl, methoxyphenyl, dimethoxyphenyl, trimethoxyphenyl, ethoxyphenyl, dimethylaminophenyl, diethylaminophenyl, dipropylaminophenyl, dibenzylaminophenyl, diphenylaminophenyl, and ditolylaminophenyl groups and the like.

Each of the substituents $R_4'$ and $R_5'$ of the polymethine dye expressed by the formula (II) is a monovalent organic residue including $R_F$ or a hydrogen atom. Examples of the $R_F$ can be used described above, and examples of monovalent organic residues other than $R_F$ include substituted or unsubstituted heterocyclic groups such as pyridyl, quinolyl, lepidyl, methylpyridyl, furyl, thienyl, indolyl, pyrrole, carbazolyl, N-ethylcarbazolyl groups and the like; substituted or unsubstituted styryl groups such as styryl, methoxystyryl, dimethoxystyryl, trimethoxystyryl, trimethoxystyryl, ethoxystyryl, dimethylaminostyryl, diethylaminostyryl, dipropylaminostyryl, dibenzylaminostyryl, diphenylaminostyryl, 2,2-diphenylvinyl, 2-phenyl-2-methylvinyl, 2-(dimethylaminophenyl)-2-phenylvinyl, 2-(diethylaminophenyl)-2-phenylvinyl, 2-(dibenzylaminophenyl)- 2-phenylvinyl, 2,2-di(diethylaminophenyl)vinyl, 2,2-di(methoxyphenyl)vinyl, 2,2-(ethoxyphenyl)vinyl, 2-(dimethylaminophenyl)-2-methylvinyl, and 2-(diethylaminophenyl)-2-ethylvinyl groups and the like.

At least one of $R_4'$ and $R_5'$ may be a fluorine-containing amino-substituted aryl group in which at least one of $R_6'$ and $R_7'$ is $R_F$, as shown by the following formula (IV):

wherein each of $R_6'$ and $R_7'$ is a hydrogen atom or a monovalent organic residue, and at least one of $R_6'$ and $R_7'$ is $R_F$.

At least one of $R_4'$ and $R_5'$ may also be an amino-substituted aryl group, as shown by the following formula (V):

wherein $R_8'$ and $R_9'$ are atoms which are required for forming in combination of $R_8'$ and $R_9'$, with a nitrogen atom, a substituted or unsubstituted fluorine-containing pyrrolidine ring, a substituted or unsubstituted fluorine-containing piperidine ring, a substituted or unsubstituted fluorine-containing morpholine ring, a substituted or unsubstituted fluorine-containing tetrahydropyridine ring, and a substituted or unsubstituted cyclohexylamine ring expressed by the following formula:

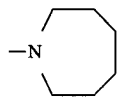

It is preferred for improving the heat resistance of the polymethine dye expressed by the formula (II) that at least one of $R_4'$ and $R_5'$ is $R_F$, or at least one of $R_4'$ and $R_5'$ is a monovalent organic residue having the $R_F$ or a monovalent organic residue having a fluorine-containing heterocyclic ring.

However, when the heat resistance of the optical recording medium and the mass-productivity thereof by wet coating the recording layer are taken into account, it is preferred that $R_4'$ and $R_5'$ each be a monovalent organic residue other than $R_F$, and at least one of $R_4'$ and $R_5'$ is a substituted or unsubstituted aryl group. When at least one of $R_4'$ and $R_5'$ is $R_F$, at least one of $R_4'$ and $R_5'$ is preferably the fluorine-containing amino-substituted aryl group expressed by the formula (IV) in which at least one, especially both, of $R_6'$ and $R_7'$ is a substituted or unsubstituted fluorine containing methyl or ethyl group, or the amino-substituted aryl group expressed by the formula (V) in which $R_8'$ and $R_9'$ are atoms required for forming in a combination of $R_8'$ and $R_9'$ with a nitrogen atom, a pyrrolidine ring substituted with a methyl group in which at least one of the hydrogen atoms is substituted with a fluorine atom (referred to as "fluorine-substituted methyl group" hereinafter), a fluorine-substituted-methyl-substituted piperidine ring, a fluorine-substituted-methyl-substituted morpholine ring, a fluorine-substituted-methyl-substituted tetrahydropyridine ring, or a fluorine-substituted-methyl-substituted cyclohexylamine ring.

Namely, when the polymethine dye compound in which $R_4'$ and $R_5'$ is used in any one of the above organic residues in the recording layer, an optical recording medium having excellent heat resistance can be obtained, and the mass-productivity of the high quality optical recording medium exhibiting a low noise level can be improved due to the excellent solvent solubility of the compound.

In the polymethine dye expressed by the formula (I) or (II), $X^{\ominus}$ indicates an anion residue such as a chlorine, bromine, iodine, perchlorate, nitrate, benzenesulfonate, p-toluenesulfonate, methyl sulfate, ethyl sulfate, propyl sulfate, tetrafluoroborate, tetraphenylborate, hexafluorophosphate, acetate, trifluoroacetate, propionacetate, benzoate, oxalate, succinate, malonate, oleate, stearate, citrate, monohydrogen diphosphate, dihydrogen monophosphate, pentachlorostannate, chlorosulfonate, fluorosulfonate, trifluoromethanesulfonate, hexafluoroarsenate, hexafluoroantimonate, molybdate, tungstate, titanate, zirconate ion or the like.

Although examples of polymethine dye compounds expressed by the formula (I) or (II) that are used in the present invention are listed in Tables 1-1 and 1-2 below, the dye compounds are not limited to these examples.

In Tables 1-1 and 1-2, the examples are simplified as shown be low.

For example, a polymethine dye having the structure (A) or (B) is shown below.

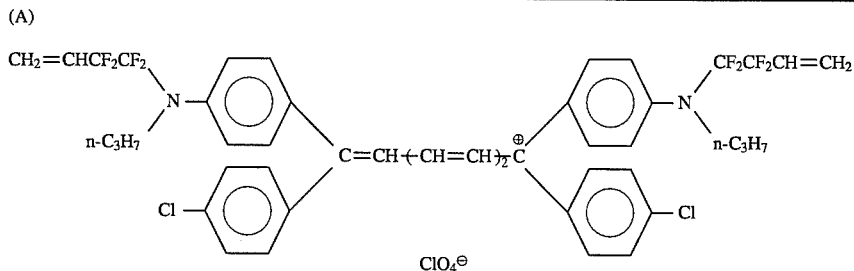

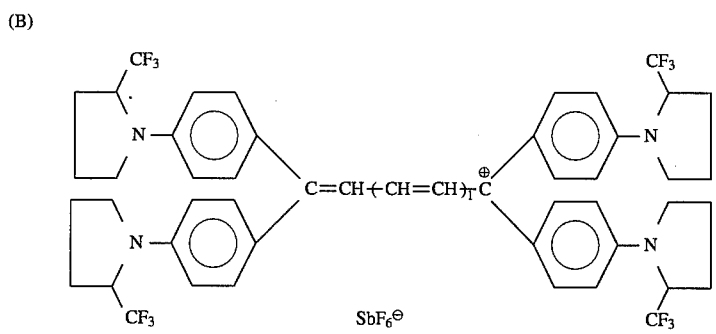

| | $(R_0, R_1)$ | $(R_2, R_3)$ | $(R_4, R_5)$ | m | X |
|---|---|---|---|---|---|
| (A) | $(CH_2=CHCF_2CF_2, n\text{-}C_3H_7)$ | ⟵ | (Cl—◯—, Cl—◯—) | 2 | $ClO_4$ |
| (B) | $CF_3$ $(CH_2CHCH_2CH_2)$ | ⟵ | (—◯—N⟨CF_3⟩, —◯—N⟨CF_3⟩) | 1 | $SbF_6$ |

TABLE 1-1

| | $(R_0, R_1)$ | $(R_2, R_3)$ | $(R_4, R_5)$ | m | X |
|---|---|---|---|---|---|
| (1) | $(-CH_2CF_3, -CH_2CF_3)$ | ↓ | $\left(\begin{array}{c}\phantom{x}\\ \text{−Ph−N(−CH}_2\text{CF}_3\text{)}_2\end{array}\right)_2$ | 1 | $ClO_4$ |
| (2) | $(-CH_2CHF_2, -CH_2CHF_2)$ | ↓ | $\left(\text{−Ph−N(CH}_2\text{CHF}_2\text{)}_2\right)_2$ | 1 | $ClO_4$ |
| (3) | $(-C_3F_7, -C_3F_7)$ | ↓ | $\left(\text{−Ph−N(C}_3\text{F}_7\text{)}_2\right)_2$ | 1 | $SbF_6$ |
| (4) | $(-CH_2C_2F_5, -CH_2C_2F_5)$ | ↓ | $\left(\text{−Ph(CH}_3\text{)}\right)_2$ | 1 | I |
| (5) | $(-C_2F_5, -C_2F_5)$ | ↓ | $\left(\text{−Ph(CH}_3\text{)}\right)_2$ | 1 | $ClO_4$ |
| (6) | $\left(\begin{array}{c}CH_3\\-CH-CF_3\end{array},\begin{array}{c}CH_3\\-CH-CF_3\end{array}\right)$ | ↓ | $\left(\text{−Ph−N(−CH(CH}_3\text{)CF}_3\text{)}_2\right)_2$ | 1 | $SbF_6$ |
| (7) | $(-CH_2CH_2F, -CH_2CH_2F)$ | ↓ | $\text{−Ph−N(−CH}_2\text{CH}_2\text{F)}_2$ | 0 | I |
| (8) | $(-C_4H_9, -C_4F_9)$ | ↓ | $\left(\text{−CH}_3, \text{−Ph−N−(C}_4\text{F}_9\text{)}_2\right)$ | 1 | $ClO_4$ |
| (9) | $(-CH_2CF_2CHFCF_3, -CH_2CF_2CHFCF_3)$ | ↓ | $\left(\text{−Ph−OC}_2\text{H}_5, \text{−Ph−OC}_2\text{H}_5\right)$ | 2 | I |

TABLE 1-1-continued

| | $(R_1, R_2)$ | $(R_2, R_3)$ | $(R_4, R_5)$ | m | X |
|---|---|---|---|---|---|
| (10) | $(-CH_2CF_3, -CH_2CF_3)$ | ↓ | 2,4-dimethylphenyl, 2,4-dimethylphenyl | 1 | $ClO_4$ |
| (11) | 4-($CF_3$)-phenyl, 4-($CF_3$)-phenyl | ↓ | 4-$N(CH_3)_2$-phenyl, 4-$N(CH_3)_2$-phenyl | 1 | $SbF_6$ |
| (12) | $(-C_2H_4OC_2F_5, -C_2H_4OC_2F_5)$ | ↓ | 2,4-dimethylphenyl, 2,4-dimethylphenyl | 1 | $SbF_6$ |
| (13) | $(-CF_2CF_2CH=CH_2, n\text{-}C_3H_7)$ | ↓ | 4-Cl-phenyl, 4-Cl-phenyl | 2 | $ClO_4$ |
| (14) | $(-C_2H_4OCF_3, -C_2H_4OCF_3)$ | ↓ | 4-$N(C_2H_4OCF_3)_2$-phenyl, 4-$N(C_2H_4OCF_3)_2$-phenyl | 1 | $ClO_4$ |
| (15) | $(-CH_2C_2F_5, -CH_2C_2F_5)$ | ↓ | 4-$N(CH_2C_2F_5)_2$-phenyl, 4-$N(CH_2C_2F_5)_2$-phenyl | 1 | $ClO_4$ |
| (16) | $(CF_3, CF_3)$ | $(C_2H_5, C_2H_5)$ | 4-methylphenyl, 4-methylphenyl | 1 | $SbF_6$ |
| (17) | $(-CH_2\text{-}(3\text{-}F\text{-phenyl}), -CH_2\text{-}(3\text{-}F\text{-phenyl}))$ | ↓ | phenyl, phenyl | 2 | I |

TABLE 1-1-continued

| | $(R_0, R_1)$ | $(R_2, R_3)$ | $(R_4, R_5)$ | m | X |
|---|---|---|---|---|---|
| (18) | $(-(CF_3)_3CF_3, -(CF_3)_3CF_3)$ | ↓ | (—C₆H₄—N(C₂H₅)₂, —C₆H₄—N(C₂H₅)₂) | 1 | $SbF_6$ |
| (19) | $(-CH_2CHF_2, -CH_2CH_2)$ | ↓ | (—C₆H₄—OCH₃, —C₆H₄—OCH₃) | 1 | $ClO_4$ |
| (20) | $(-CF=CF_2, -CF=CF_2)$ | ↓ | (—C₆H₄—N(C₂H₅)₂, —C₆H₄—N(C₂H₅)₂) | 1 | $ClO_4$ |
| (21) | $(-CF_2CF_2OCF_2CF_3, -CF_2CF_2OCF_2CF_3)$ | ↓ | (—C₆H₄—N(C₂H₅)₂, —C₆H₄—N(C₂H₅)₂) | 1 | I |
| (22) | $\begin{pmatrix} OH & OH \\ -CH_2CHF, & -CH_2CHF \end{pmatrix}$ | ↓ | (—C₆H₄—CH₃, —C₆H₄—CH₃) | 2 | $SbF_6$ |
| (23) | $(-CF_2CF_2CH=CH_2, -CF_2CF_2CH=CH_2)$ | ↓ | (—C₆H₄—N(—CF₂CF₂CH=CH₂)₂, —C₆H₄—N(—CF₂CF₂CH=CH₂)₂) | 1 | $ClO_4$ |
| (24) | $(CF_3, CF_3)$ | ↓ | (—C₆H₄—C₆H₅, —C₆H₄—C₆H₅) | 1 | $ClO_4$ |
| (25) | $(C_2F_5, C_2F_5)$ | ↓ | (—C₆H₄—N(C₂F₅)₂, —C₆H₄—N(C₂F₅)₂) | 1 | $SbF_6$ |
| (26) | $(-CF_2CH=CH_2, -CF_2CH=CH_2)$ | ↓ | (—CF₂CH=CH₂, —CF₂CH=CH₂) | 1 | $SbF_6$ |

TABLE 1-1-continued

| # | | Left group | Right group | n | Anion |
|---|---|---|---|---|---|
| (27) | → | $(-CF=CF_2, -CF=CF_2)$ | (Ph, Ph) | 1 | $ClO_4$ |
| (28) | → | 4-CF$_3$-C$_6$H$_4$- (two) | 4-CH$_3$-C$_6$H$_4$-, 4-CH$_3$-C$_6$H$_4$- | 1 | I |
| (29) | → | $(-CH(CH_3)-CF_3,\ -CH(CH_3)-CF_3)$ | 4-[CH(CH$_3$)(CF$_3$)]-C$_6$H$_4$- (two) | 1 | $SbF_6$ |
| (30) | → | $(-CH_2CF_3,\ -CH_2CF_3)$ | (Ph, Ph) | 1 | $ClO_4$ |
| (31) | → | $(-CH(CF_3)CH_2CH_2CH_3,\ -CHCH_2CH_2CH_2$ with CF$_3$) | 4-N(C$_2$H$_5$)$_2$-C$_6$H$_4$-, 4-N(C$_2$H$_5$)$_2$-C$_6$H$_4$- | 1 | $ClO_4$ |
| (32) | → | $(-H_2CH-CF_3,\ -CH_2CH-CF_3)$ with CF$_3$ groups | 4-[N(-CH$_2$CH(CF$_3$)$_2$)]-C$_6$H$_4$- (two) | 1 | $SbF_6$ |
| (33) | → | $(-CH_2CHF_2,\ -CH_2CHF_2)$ | 4-N(C$_2$H$_5$)$_2$-C$_6$H$_4$-, 4-N(C$_2$H$_5$)$_2$-C$_6$H$_4$- | 1 | $ClO_4$ |

TABLE 1-1-continued

| # | R | R' | n | X |
|---|---|---|---|---|
| (34) | —CH₂CF₂CF₂OCH₃, —CH₂CF₂CF₂OCH₃ | N(—CH₂CF₂CF₂OCH₃)₂-C₆H₄-, N(—CH₂CF₂CF₂OCH₃)₂-C₆H₄- | 1 | SbF₆ |
| (35) | (—C₃F₇, —C₃F₇) | (—CH₃, phenyl) | 2 | I |
| (36) | F₅-C₆-CH₂-C₆F₄-CH₂- (pentafluorobenzyl / tetrafluorophenyl-methylene) | (biphenyl) | 1 | ClO₄ |
| (37) | (CH₂(CF₂)₃CF₂H, CH₂(CF₂)₃CF₂H) | (n-C₄H₉, n-C₄H₉) | — | — |
| (38) | (—CH₂CH₂CF₃, —CH₂CH₂CF₃) | (C₂H₄OCH₃, C₂H₄OCH₃) | 1 | SF₆ |
| (39) | (—CH₂C₂F₅, —CH₂C₂F₅) | [(CH₃)₂N-C₆H₄-]₂ with N(CH₃)₂ substituted phenyl groups | 0 | ClO₄ |
| (40) | (—C₂C₄OCF₃, —C₂H₄OCF₃) | (—C₂H₅, —C₂H₅) | 1 | ClO₄ |
| (41) | —CH₂CF₂(COOCH₃)- phenyl | (biphenyl, biphenyl) | 1 | SbF₆ |
|      |   |   | 1 | ClO₄ |

TABLE 1-1-continued

| | | | |
|---|---|---|---|
| (42) | —CHCH(COOH)— with F,F substituents, phenyl | → | phenyl-phenyl | 1 | ClO$_4$ |
| (43) | F-phenyl-F, phenyl-F | → | (phenyl-N(CF$_3$)$_2$)(phenyl-N(CF$_3$)$_2$) | 1 | ClO$_4$ |

TABLE 1-2

| | $(R_0', R_1')$ | $(R_2', R_3')$ | $(R_4', R_5')$ | m | X |
|---|---|---|---|---|---|
| (101) | $\left(\begin{array}{c}CF_3\\|\\-CHCH_2CH_2CH_2-\end{array}\right)$ | ← | (4-substituted phenyl-N-pyrrolidinyl with CF$_3$ substituent, two instances) | 1 | ClO$_4$ |
| (102) | $\left(-\underset{|}{\overset{CF_3}{C}}HCH_2CH_2\underset{|}{\overset{CF_3}{C}}H-\right)$ | ← | (phenyl-N-pyrrolidinyl with two CF$_3$ groups, two instances) | 1 | ClO$_4$ |
| (103) | $(-CH_2CH_2CF_2CH_2CH_2-)$ | ← | (phenyl-N-piperidinyl with gem-diF, two instances) | 1 | I |
| (104) | $\left(\begin{array}{c}CF_3\\|\\-CHCH_2CH_2CH_2CH_2-\end{array}\right)$ | ← | (phenyl-N-piperidinyl with CF$_3$, two instances) | 1 | ClO$_4$ |
| (105) | $\left(-CH_2CH_2OCH\underset{|}{\overset{CH_3}{}}-\right)$ | ← | (phenyl-N-morpholinyl with CF$_3$, two instances) | 1 | ClO$_4$ |
| (106) | $\left(-\underset{|}{\overset{CF_3}{C}}HCH_2OCH\underset{|}{\overset{CF_3}{}}-\right)$ | ← | (phenyl-N-morpholinyl with two CF$_3$, two instances) | 1 | I |
| (107) | $\left(-CH=\underset{|}{\overset{CF_3}{C}}CH_2\underset{|}{\overset{CF_3}{C}}CH_2-\right)$ | ← | (phenyl-N-tetrahydropyridinyl with (CH$_3$)$_2$ and CF$_3$, two instances) | 1 | ClO$_4$ |
| (108) | $\left(\begin{array}{c}CF_3\\|\\-CHCH_2CH_2CH_2CH_2CH_2-\end{array}\right)$ | ← | (phenyl-N-azepanyl with CF$_3$, two instances) | 1 | ClO$_4$ |

| | $(R_0, R_1)$ | $(R_2, R_3)$ | $(R_4, R_5)$ | m | X |
|---|---|---|---|---|---|
| (109) | $(-CH_2CH_2CF_2CF_2CH_2CH_2-)$ | ← | (phenyl-N-azepanyl with tetra-F, two instances) | 1 | ClO$_4$ |
| (110) | $\left(-\underset{|}{\overset{CF_3}{C}}HCH_2CH_2\underset{|}{\overset{CF_3}{C}}H-\right)$ | ← | (phenyl-N(C$_2$H$_5$)$_2$, two instances) | 1 | ClO$_4$ |

The polymethine dye compound used in the present invention can be synthesized in accordance with the synthetic method disclosed in B. S. Wildi et al. "Journal of American Chemical Society", 80, 3772–3777, 1958, H. Schmidt et al., "Liebig Annalen der Chemie (Ann)" 623, 204–216, 1959 or R. Wilzinger et al., "Helv. Chim. Acta.", 24, 369, 1941.

Referring to FIG. 1, the optical recording medium of the present invention comprises a substrate (1) and a recording layer (2) provided on the substrate (1) and the recording layer (2) containing a polymethine dye compound shown by the above formula (I) or (II).

As the substrate (1), plastics such as polycarbonates, polyesters, acrylic resins, polyolefin resins, phenol resins, polyamides, polyimide, etc; glasses; or metals can be used.

The recording layer (2) can be formed by using the polymethine dye compounds expressed by the formula (I) or (II) singly or in combination of two or more compounds. The recording layer (2) may be formed by using a mixture dispersion containing the polymethine dye compounds and other dyes such as a polymethine dye other than those expressed by the formula (I) or (II), such as a naphtolactam dye, an azulene dye, a pyrylium dye, a squalium dye, a croconium dye, a triphenylmethane dye, a xanthene dye, an anthroquinone dye, a cyanine dye, a phthalocyanine dye, a dioxazine dye, a tetrahydrocholine dye, a triphenothiazine dye, or a phenanthrene dye; or a metal or metal compound such as Al, Te, Bi, Sn, In, Se, SnO, $TeO_2$, As, Cd or the like, or by laminating these compounds.

A stabilizer may be mixed in the recording layer (2) in order to improve the light resistance thereof. Examples of such stabilizers that can be used include various metal chelate compounds, particularly chelate compounds each having as a central metal Zn, Cu, Ni, Cr, Co, Mn, Pd or Zr, and a multidentate ligand, e.g., a four-dentate ligand such as $N_4$, $N_2O_2$, $N_2S_2S_4$, $O_2S_2$, $O_4$ or the like, or combination thereof; various aromatic amines; diamines and nitrogen-containing aromatic groups; onium salts thereof such as aminium salts, diimonium salts, pyridinium salts, imidazolinium salts, quinolinium salts and the like; oxygen-containing aromatic salts such as pyrylium salts and the like.

Specifically, an aminium salt expressed by the formula (VI) below and a diimonium salt expressed by the formula (VII) below exhibit good compatibility with the polymethine dye compound when the recording layer is formed by wet coating, thereby permitting the formation of the optical recording medium having excellent durability, light resistance and high performance.

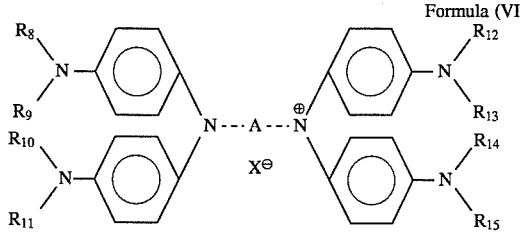

Formula (VI)

wherein A indicates

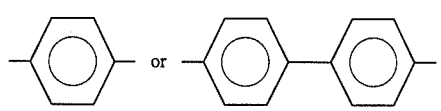

$R_8$ through $R_{15}$ each indicate a substituent having 1 to 8 carbon atoms, and $X^\ominus$ indicates an anion.

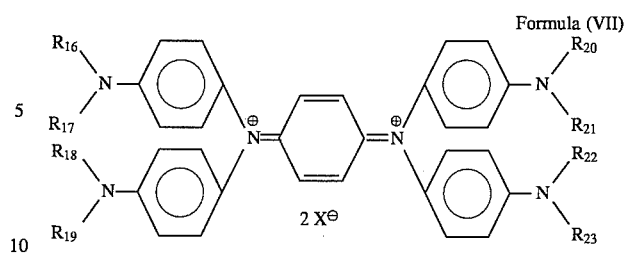

Formula (VII)

wherein $R_{16}$ through $R_{23}$ each indicate a substituent having 1 to 8 carbon atoms, and $X^\ominus$ indicates an anion.

The ratio by weight of the stabilizer to the polymethine dye contained as an optical recording material in the recording layer is preferably $1/100$ to $50/100$, more preferably $10/100$ to $45/100$.

When at least one of $R_8$ through $R_{15}$ of an aminium salt compound expressed by the formula (VI) is an alkoxyalkyl group, an alkenyl group or an alkynyl group, the solvent solubility of the aminium salt compound can be increased, thereby making the compound preferable for forming the recording layer of the optical recording medium of the present invention by wet coating.

For the same reason as that described above, at least one of $R_{16}$ through $R_{23}$ of an aminium salt compound expressed by the formula (VII) is preferably an alkoxyalkyl group, an alkenyl group or an alkynyl group.

Although the recording layer (2) can be formed on the substrate (1) by various processes such as the wet coating process or the vapor phase deposition process such as a vapor deposition process or the like, the wet coating process is particularly preferred for decreasing the cost of the optical recording medium.

The use of the wet coating process permits the recording layer (2) to be formed by coating on the substrate (1) a solution of an organic solvent in which the polymethine compound is dissolved or a dispersion of polymethine dispersed in an organic solvent, and, if required, the recording layer may contain a binder in view of the film-forming properties and the stability of the coated film.

The organic solvent which can be used in wet coating depends upon the state of the polymethine dye compound, i.e., whether as a dispersion state or as a solution. Examples of organic solvents that can generally be used include alcohols, ketones, amides, ethers, esters, aliphatic halogenated hydrocarbons, aromatic solvents, aliphatic hydrocarbons, fluorine solvents and the like. Solvents having excellent dissolving power for the polymethine dye compound of the present invention are especially preferred.

On the other hand, when the recording layer (2) is coated on the resin substrate (1), of the above organic solvents, organic solvents which do not dissolve the surface of the substrate and which produce no crack on the surface thereof must be used.

However, since the polymethine dye compound of the present invention exhibits excellent solvent solubility, when the organic dye is coated, a coating solvent or a substrate material can be selected from a wide range of solvents or materials, and the conditions for producing an excellent optical recording medium having a low noise level can be minimized, as compared with conventional conditions.

Nitrocellulose, ethyl cellulose, polystyrene, polyvinyl pyrrolidone, polymethyl methacrylate, polyamide and the like can be exemplified as the binder. If required, wax, a higher aliphatic acid, and an amide (for example, oleyl amide) can be added as additives.

A plasticizer such as dioctyl phthalate, dibutyl phthalate, tricresyl phosphate or the like; an oil agent such as mineral oil, vegetable oil or the like; a disperant such as sodium alkylbenzenesulfonate, polyoxyethylene alkylphenyl ether or the like; and other additives can be appropriately added to the binder in order to improve the film-forming properties of the recording layer and the stability of the coated film.

The coating of the recording layer can be performed by a coating method such as a dip coating method, a spray coating method, a spinner coating method, a bead coating method, a Mayer bar coating method, a blade coating method, a curtain coating method, a roller coating method, a gravure coating method or the like.

The content of the polymethine compound in the recording layer (2) is generally 1% by weight or more, and preferably 40 to 100% by weight, more preferably 50 to 100% by weight. With a content of more than 40% by weight, the recording layer exhibiting sufficient light absorption and sufficient reflectance for a reproduction laser beam can be obtained.

The thickness of the recording layer (2) is 100 Å to 2 μm, preferably 200 Å to 1 μm. The thickness of the recording layer (2) is preferably as small as possible so long as a thin film having sufficient reflectance for a recording laser beam can be stably formed.

Figure 2:
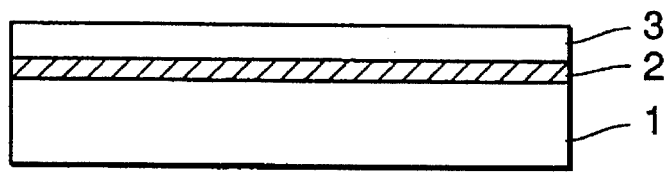
FIG. 2 is a schematic sectional view of an optical recording medium in accordance with another embodiment of the present invention.

The optical recording medium of the present invention may further comprise a transparent protective layer (3) provided on the recording layer (2) and transmitting the recording and reproduction laser beam, as shown in FIG. 2. When light is applied from the side of the substrate (1), the protective layer (3) may be opaque.

Figure 3:
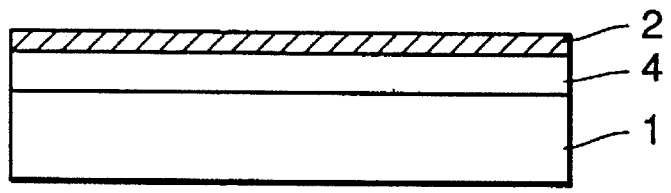
FIG. 3 is a schematic sectional view of an optical recording medium in accordance with a further embodiment of the present invent ion.
Figure 4:
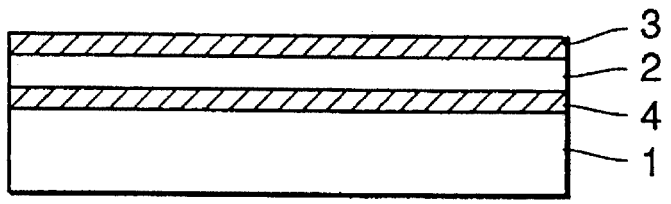
FIG. 4 is a schematic sectional view of an optical recording medium in accordance with a still further embodiment of the present invention.

An undercoat layer (4) may be provided between the substrate (1) and the recording layer (2), as shown in FIG. 3, and both the protective layer (3) and the undercoat layer (4) may be provided as shown in FIG. 4.

The undercoat layer (4) is provided for (a) improving adhesion between the substrate (1) and the recording layer (2), (b) providing a barrier to water or gases, (c) improving the preservation stability of the recording layer (2), (d) improving the relfectance, (e) protecting the substrate (1) from the solvent used for wet-coating of the recording layer, and (f) forming a pregroove. For the purpose (a), a polymer material such as an ionomer resin, a polyamide resin, a vinyl resin, a natural polymer, silicone, liquid rubber or the like, or a silane coupling agent can be used. For the purposes (b) and (c), any one of the above: polymer materials or an inorganic compound such as $SiO_2$, $MgF_2$, SiO, $TiO_2$, ZnO, TiN, SiN or the like, a metal such as Zn, Cu, S, Ni, Cr, Ge, Se, Cd, Ag, Al or the like can be used. For the purpose (d), a metal such as Al or Ag, or an organic thin film with metallic luster, such as a cyanine dye, a methine dye or the like, can be used. For the purposes (e) and (f), an ultraviolet-curing resin, a thermoset resin, a thermoplastic resin or the like can be used. The thickness of the undercoat layer is 50 Å to 100 μm, preferably 200 Å to 30 μm.

The protective layer (3) is provided for protection from flaws, dust and soil and improving the preservation stability and reflectance of the recording layer (2). The same materials as those used for the undercoat layer (4) can be used. The thickness of the protective layer (3) is at least 100 Å, preferably at least 1000 Å.

The undercoat layer (4) and/or the protective layer (3) may contain the polymethine dye compound expressed by the formula (I) or (II). The undercoat layer (4) or the protective layer (3) may contain a stabilizer, a dispersant, a flame retarder, a lubricant, an antistatic agent, a surfactant, a plasticizer and the like.

In another embodiment of the present invention, an optical recording medium may have a so-called air sandwich structure in which the two same recording media (one of which comprises the substrate only) each having the structure shown in any one of FIGS. 1 to 4 are sealed with the recording layers (2) on the inside thereof. Alternatively, an optical recording medium may have a so-called laminated structure in which the two recording media are bonded with the protective layers (3) therebetween.

The optical recording medium (a record blank without recorded information) of the present invention produced by the above-described method is irradiated with a modulated recording electromagnetic radiation to decolor or discolor the recording layer (2) or produce recesses (pits) therein, thereby producing an information record with recorded information.

Specifically, the optical recording medium of the present invention permits recording by irradiation with a gas laser such as a helium-neon laser (oscillation wavelength, 633 nm), preferably a laser having a wavelength of 750 nm or more. A particularly preferable recording method is forming recesses in the recording layer by irradiation with a laser beam having an oscillation wavelength within the near infrared or infrared region, such as a gallium-aluminum-arsenide semiconductor laser (oscillation wavelength 830 nm). And, for reading the recorded information, the above laser beam regulated in intensity so as not to change the recording layer can be used. The writing and reading laser beam may have the same wavelength or different wavelength.

As described above, the present invention enables the formation of an optical recording medium having excellent stability and excellent heat resistance under high-temperature conditions.

The present invention also enables the formation of an optical recording medium having a constant low noise level and excellent heat resistance.

The present invention further enables the production of an optical recording medium with excellent heat resistance and high productivity.

EXAMPLES

The present invention will be described in more detail by the following examples, but the invention is by no means limited by these.

Example 1-1

On the surface of the transparent substrate of polycarbonate (hereinafter abbreviated as PC) molded by the injection molding method in a doughnut-like form having an outer diameter of 130 mmφ, an inner diameter of 15 mmφ and a thickness of 1.2 mm equipped with a spiral tracking groove of 0.6 μm width and 1.6 μm pitch, the solution in which 3 parts by weight of polymethine coloring matter compound No. (1) described above was dissolved with 97 parts by weight of diacetone alcohol was coated by the spinner coating method, followed by drying to form a 800Å-thick of recording layer.

Subsequently, the PC protective substrate having a same form of the substrate was set up thereon through interposition of the spacer of 0.33 mm thick to obtain an air-sandwich structural optical disk. In the bonding both of between the substrate and the spacer and between the spacer and the protective substrate, an ultraviolet rays curing adhesive was used.

The recording layer of the optical disk thus obtained was measured for the transmittance to the light of 830 nm of wavelength by using of the spectrophotometer (trade name: U-3400, produced by Hitachi Seisakujo Co., Ltd. ), which was the initial transmittance.

Next, the optical disk was installed on the turntable, and an information was written on the recording layer from the substrate side at a spot size of 1.5 µmφ at a recording power laser of 8 mW at a recording frequency of 3 MHz by the semiconductor laser at 830 nm of oscillation wavelength, while rotating the turntable at 1800, rpm. After reproducing at a reading laser power of 0.6 mW, the reproductive waveform was spectrum-analyzed (scanning filter, a band width of 30 KHz) to measure C/N ratio, which was the initial C/N ratio.

After the reproduction of information recorded part of the optical disk was repeated $10^5$ times, the C/N ratio was measured (i.e., the repeated reproductive stability).

Another optical disk of Example 1 was also prepared in the same manner as the process mentioned above, and then information was written thereon under the same conditions as those mentioned above. After permitted to stand at 85° C. for 1000 hours, the recording layer was subjected to the measurement of the transmittance to the light at wavelength of 830 nm and C/N ratio of the recorded information in the same manner as the above process (i.e., the environmental storage stability).

In order to evaluate the thermal resistance of the optical disk, the changing ratio of the C/N ratio obtained in the evaluation of the environmental storage stability relative to the initial C/N ratio (ΔC/N) was determined by the following equation:

ΔC/N=[(a-b)/a]×100 a: the initial C/N ratio;

b: the C/N ratio measured after retaining for 1000 hours at 85° C.

The evaluated results are shown in Table 2-1.

TABLE 2-1

| | Initial value | | Repeated reproductive stability after $10^5$ times | Environmental storage stability at 85° C. for 1000 hours | | |
| --- | --- | --- | --- | --- | --- | --- |
| | trans-mittance (%) | C/N ratio (dB) | C/N ratio (dB) | trans-mittance (%) | C/N ratio (dB) | ΔC/N (%) |
| Ex. 1-1 | 20.8 | 57 | 55 | 22.9 | 55 | 3.5 |

Examples 1–2 to 1–9

The recording mediums were prepared in the same manner as Example 1-1 except using polymethine coloring matter compounds Nos. (4), (7), (10), (16), (19), (24), (30) and (33) instead of a polymethine coloring matter compound No. (1) to obtain the optical disks of Examples 1–2 to 1–9, respectively.

The above optical disks of Examples 1–2 to 1–9 were evaluated the repeated reproduction stability and the environmental storage stability in the same manner as Example 1-1. The results are shown in Table 2-2.

TABLE 2-2

| | | Initial value | | Repeated reproductive stability after $10^5$ times | Environmental storage stability at 85° C. for 1000 hours | | |
| --- | --- | --- | --- | --- | --- | --- | --- |
| | Compound No. | trans-mittance (%) | C/N ratio (dB) | C/N ratio (dB) | trans-mittance (%) | C/N ratio (dB) | ΔC/N (%) |
| Ex. | | | | | | | |
| 1-2 | (4) | 21.2 | 57 | 56 | 23.2 | 55 | 3.5 |
| 1-3 | (7) | 19.9 | 56 | 54 | 22.1 | 54 | 3.6 |
| 1-4 | (10) | 20.5 | 54 | 52 | 23.1 | 52 | 3.7 |
| 1-5 | (16) | 22.1 | 56 | 55 | 24.0 | 54 | 3.6 |
| 1-6 | (19) | 22.4 | 54 | 53 | 24.3 | 52 | 3.7 |
| 1-7 | (24) | 20.8 | 52 | 51 | 22.9 | 50 | 3.8 |
| 1-8 | (30) | 21.5 | 56 | 54 | 24.0 | 54 | 3.6 |
| 1-9 | (33) | 21.9 | 57 | 56 | 23.7 | 55 | 3.5 |

Examples 1–10 to 1–17

The optical disks of the Examples 1–10 to 1–17 were prepared in the same manner as Example 1-1 except using polymethine coloring matter compounds Nos. (23), (17), (11), (101), (103), (105), (107) and (108), respectively, instead of a polymethine coloring matter compound No. (1).

The above optical disks of Examples 1–10 to 1–17 were evaluated for the repeated reproduction stability and the environmental storage stability in the same manner as Example 1-1. The results are shown in Table 3 below.

TABLE 3

| | | Initial value | | Repeated reproductive stability after $10^5$ times | Environmental storage stability at 85° C. for 1000 hours | | |
| --- | --- | --- | --- | --- | --- | --- | --- |
| Ex. | Compound No. | trans-mittance (%) | C/N ratio (dB) | C/N ratio (dB) | trans-mittance (%) | C/N ratio (dB) | ΔC/N (%) |
| 1-10 | (23) | 21.2 | 55 | 54 | 23.5 | 53 | 3.6 |
| 1-11 | (17) | 20.6 | 56 | 54 | 23.2 | 54 | 3.6 |
| 1-12 | (11) | 19.9 | 54 | 53 | 22.3 | 52 | 3.7 |
| 1-13 | (101) | 20.3 | 56 | 55 | 22.5 | 54 | 3.6 |
| 1-14 | (103) | 21.0 | 53 | 52 | 23.6 | 51 | 3.8 |
| 1-15 | (105) | 20.5 | 55 | 53 | 23.1 | 53 | 3.6 |
| 1-16 | (107) | 19.8 | 54 | 52 | 22.4 | 52 | 3.7 |
| 1-17 | (108) | 22.2 | 55 | 53 | 24.1 | 53 | 3.6 |

Comparative Examples 1-1 to 1–4

The optical disks of Comparative Examples 1-1 to 1–4 were prepared in the same manner as Example 1-1 except using polymethine coloring matter compounds Nos. (201), (202), (203)and (204)shown in Table 4-1 below, respectively, Instead of a polymethine coloring matter compound No. (1).

The above optical disks of Comparative Examples 1-1 to 1–4 were evaluated the repeated for reproduction stability and the environmental storage stability in the same manner as Example 1-1. The results are shown in Table 4-2 below.

TABLE 4-1

| Compound No. | Structural formula |
|---|---|
| 201 | (structure: bis-naphthoindole pentamethine cyanine with N-C₂H₅ groups, ClO₄⁻) |
| 202 | (structure: bis[4-(dimethylamino)phenyl-N,N-dimethyl] pentamethine, ClO₄⁻) |
| 203 | (structure: squarylium dye with (CH₃)₂N- and =N⁺(CH₃)₂ groups, O⁻) |
| 204 | (structure: bis[4-(diethylamino)phenyl] pentamethine with F substituents, ClO₄⁻) |

TABLE 4-2

| CEx. | Compound No. | Initial value transmittance (%) | Initial value C/N ratio (dB) | Repeated reproductive stability after $10^5$ times C/N ratio (dB) | Environmental storage stability at 85° C. for 1000 hours transmittance (%) | Environmental storage stability at 85° C. for 1000 hours C/N ratio (dB) | ΔC/N (%) |
|---|---|---|---|---|---|---|---|
| 1-1 | (201) | 22.1 | 50 | 45 | 36.1 | 35 | 30 |
| 1-2 | (202) | 19.8 | 54 | 49 | 28.3 | 43 | 20 |
| 1-3 | (203) | 20.2 | 52 | 50 | 25.1 | 46.2 | 11 |
| 1-4 | (204) | 19.3 | 55 | 54 | 24.0 | 49.5 | 10 |

Apparently from the Tables 2-2, 3 and 4-2, the optical recording mediums of the present invention can suppress the decreasing ratio of C/N ratio to ½ or less relative to the conventional optical recording mediums at a high temperature.

Example 1-18

The optical disk of Example 1-18 was prepared by coating a mixed solution of the above compound No. (201) and the polymethine coloring matter compound No. (4) of the present invention in the mixing ratio of 1:2 by weight with diacetone alcohol in the same manner as Example 1—1 to form an organic thin film of recording layer of 850Å thick.

Example 1-19

The optical disk of Example 1-19 was prepared in the same manner as Example 1-18 except using the compound No. (202) instead of the compound No. (201).

The above optical disks of Examples 1-18 and 1-19 was evaluated the repeated for reproduction stability and the environmental storage stability in the same manner as Example 1—1. The results are shown in Table 5.

Example 1-20

The optical disk of Example 1-20 was prepared by coating a mixed solution of 2 parts by weight of the above compound No. (2) and 1 part by weight of nitrocellulose resin (OH-lesslacker, produced by Daisel Kagaku Co. , Ltd. ) with 97 parts by weight of diacetone alcohol by the spinner coating method on PC substrate prepared in the same manner as Example 1-1 to form a recording layer of dried film thickness of 1000Å.

The optical disk thus obtained was evaluated for the repeated reproduction stability and the environmental storage stability in the same manner as Example 1—1.

Examples 1–21 to 1–23

The optical disks of Examples 1–21 to 1–23 were prepared in the same manner as Example 1–20 except using the above compounds Nos. (5), (15) and (25), respectively, instead of the compound No. (2).

The above optical disks of Examples 1–21 to 1–23 were evaluated for the repeated reproduction stability and the environmental storage stability in the same manner as Example 1—1.

The evaluation results of these Examples are also shown in Table 5 below.

TABLE 5

| Ex. | Compound No. | Initial value trans- mittance (%) | | Repeated reproductive stability after $10^5$ times C/N ratio (dB) | Environmental storage stability at 85° C. for 1000 hours | | |
|---|---|---|---|---|---|---|---|
| | | | C/N ratio (dB) | | trans- mittance (%) | C/N ratio (dB) | ΔC/N (%) |
| 1-18 | (4), (201) | 21.6 | 53 | 51 | 25.3 | 50 | 5.7 |
| 1-19 | (4), (202) | 20.5 | 54 | 52 | 23.8 | 51 | 5.6 |
| 1-20 | (2) | 24.1 | 55 | 54 | 26.0 | 52 | 5.5 |
| 1-21 | (5) | 23.9 | 54 | 52 | 25.9 | 51 | 5.6 |
| 1-22 | (15) | 24.7 | 52 | 50 | 26.8 | 50 | 3.8 |
| 1-23 | (25) | 22.9 | 54 | 53 | 25.2 | 52 | 3.7 |

Example 2–1

On the rectangular substrate of polycarbonate (hereinafter abbreviated as "PC") having a wallet-size (54 mm long×85 mm broad) of 0.4 mm thick, the stripped pregrooves of 3 μm width, 12 μm of pitch, and 85 mm of length were formed by the heat pressing method. Subsequently, the mixed solution of 3 parts by weight of said polymethine coloring matter compound No. (1) with 97 parts by weight of diacetone alcohol was coated thereon by the bar coating method and then dried to form a 1000Å of recording layer. Further, the transparent PC protective substrate having a wallet-size of 0.3 mm thick was laminated thereon through interposition of the acrylic ester-based dry film, followed by contact-bonding by using the heat fixing roll to prepare a laminated structural optical card.

The optical card thus obtained was subjected to measurement of the transmittance of the recording layer by the semiconductor laser beam at 830 nm of wavelength.

Next, on the optical card, Information was written on the recording track between the pregrooves of the organic thin film of the recording layer by using the semiconductor laser at 830 nm of oscillating wavelength from the side of the 0.4 mm thick of PC substrate at a spot size of 3.0 μmφ, a recording power of 3.2 mW, and a recording pulse of 50 μsec, while transporting the optical card to the direction along the pregrooves. Subsequently, the recorded information was reproduced by scanning the semiconductor laser beam at a power reduced to 0.3 mW on the recording track to measure the contrast ratio of the reproductive signals. The above writing and reproducing procedures were carried out by installing the optical cards in the recording/reproducing apparatus for the optical card (produced by Canon Co., Ltd), and the contrast ratio was determined by the following equation:

Contrast ratio (Cont.)=[(A-B)/A]

A: the signal strength of the non-recorded part;

B: the signal strength of the recorded part.

Next, the optical card on which Information was recorded, was subjected to the measurements for the transmittance of the recording layer and the contrast ratio of the recorded information after permitted to stand at 85° C. for 1000 hours in the same manner as Example 1—1. In order to evaluate the thermal heat resistance of the optical card, the changing ratio of the contrast ratio after tested for the environmental storage stability relative to the initial contrast ratio (Δ Cont.) was determined by the following equation:

ΔCont.=[(Cont.)$_0$—(Cont.)$_{85}$]/(Cont.)$_0$ (Cont.)$_O$: the initial contrast ratio;

(Cont.)$_{85}$: the contrast ratio after tested the environmental storage stability.

Another optical card of Example 2-1 was prepared in the same manner as the process mentioned above was subjected to the light resistance test for 10 hours by using the fade meter (trade name: Xenon Long Life Fade meter FAL-25AX; produced by Suga Test Machine Co., Ltd.).

Examples 2—2 to 2–9

The optical cards of Examples 2—2 to 2–9 were prepared in the same manner as Example 2-1 except using said compounds Nos. (7), (15), (33), (2), (4), (30), (102) and (104), respectively, instead of the compound No. (1), to evaluate the environmental storage stability and the light resistant stability in the same manner as Example 2-1.

The results of above Examples 2-1. to 2–9 are shown in Table 6 below.

TABLE 6

| Ex. | Compound No. | Initial value trans- mittance (%) | con- trast ratio | Environmental storage stability at 85° C. for 1000 hr. | | Feed meter light resistance test after 10 hr. | |
|---|---|---|---|---|---|---|---|
| | | | | trans- mittance (%) | con- trast ratio | trans- mittance (%) | ΔC/N (%) |
| 2-1 | (1) | 21.0 | 0.63 | 22.9 | 0.60 | 36.7 | 4.8 |
| 2-2 | (7) | 21.9 | 0.59 | 24.7 | 0.56 | 38.1 | 5.1 |
| 2-3 | (15) | 22.3 | 0.61 | 24.3 | 0.59 | 39.4 | 3.3 |
| 2-4 | (33) | 22.5 | 0.60 | 24.6 | 0.57 | 37.3 | 5.0 |
| 2-5 | (2) | 23.0 | 0.58 | 24.9 | 0.56 | 38.7 | 3.4 |
| 2-6 | (4) | 21.5 | 0.59 | 23.6 | 0.57 | 36.5 | 3.4 |
| 2-7 | (30) | 21.7 | 0.60 | 24.4 | 0.58 | 38.3 | 3.3 |
| 2-8 | (102) | 22.8 | 0.61 | 24.8 | 0.58 | 37.5 | 4.9 |
| 2-9 | (104) | 22.6 | 0.59 | 24.0 | 0.56 | 38.0 | 5.1 |

Comparative Examples 2–1 to 2–4

The optical cards of Comparative Examples 2–1 to 2–4 were prepared in the same manner as Example 2–1 except using the compounds Nos. (201), (202), (203) and (204) shown in above Table 3, respectively, instead of the coloring matter compound No. (1), evaluate the environmental storage stability and the light resistance stability in the same manner as Example 2–1.

The results are shown in Table 7 below.

TABLE 7

| CEx. | Compound No. | Initial value | | Environmental storage stability at 85° C. for 1000 hr. | | Feed meter light resistance test after 10 hr. | |
|---|---|---|---|---|---|---|---|
| | | trans-mittance (%) | con-trast ratio | trans-mittance (%) | con-trast ratio | trans-mittance (%) | ΔC/N (%) |
| 2-1 | (201) | 21.4 | 0.55 | 32.9 | 0.43 | 89.1 | 21.8 |
| 2-2 | (202) | 19.1 | 0.59 | 26.1 | 0.46 | 64.7 | 22.0 |
| 2-3 | (203) | 20.3 | 0.58 | 25.2 | 0.51 | 62.5 | 12.1 |
| 2-4 | (204) | 19.5 | 0.60 | 24.1 | 0.54 | 50.3 | 10.0 |

Example 3–1

The solution in which 3 parts by weight of polymethine coloring matter compound used in Example 2–5 was dissolved with 97 parts by weight of diacetone alcohol, was prepared. On the other hand, 200 wallet-sized PC substrates used in Example 2–1 were provided for preparation of the optical cards. The preparation for 200 optical cards was carried out in the same manner as Example 2–1 by using the substrates obtained by continuously coating the above solution on the above substrates by the roll coating method to form the recording layers having a dried film thickness of 1000Å.

The optical cards prepared by using the substrates in which the coating turn of the recording layer was 1st, 10th, 50th, 100th and th (hereinafter called the optical cards No.1, No.10, No.50, No.100 and No.200, respectively) were installed in the recording/reproducing apparatus for the optical card, respectively. Subsequently, the semiconductor laser at 830 nm of oscillation wavelength was incident on their recording layers on the recording tracks between the pregrooves from the PC substrate side, respectively, while the optical cards were transported to the direction along the pregrooves, to record information under the following conditions:

The recording conditions:

laser spot size: 3 μmφ;

recording power: 3.2 mW;

recording pulse: 50 μsec;

card feed speed: 60 m m/sec.

Next, the information was reproduced by scanning the semiconductor laser at a power reduced to 0.3 mW on the recording track on which the Information was recorded. The reproductive waveforms were spectrum-analyzed to measure the noise level and the C/N ratio of each optical card.

The results are shown in Table 7-1.

Examples 3–2 to 3–5

Another 200 optical cards of the Examples 3–2 to 3–5 were prepared in the same manner as Example 3–1 except for using the compounds Nos. (4), (30), (33) and (101), respectively, instead of the compound No. (2), to measure and evaluate the noise levels and the C/N ratios of the optical cards No. 1, No. 10, No. 50, No. 100 and No. 200 in the same manner as Example 3–1.

The results are shown in Table 7-1 below.

TABLE 7-1

| | | Optical card No. | | | | |
|---|---|---|---|---|---|---|
| | | No. 1 | No. 10 | No. 50 | No. 100 | No. 200 |
| Ex. 3-1 | Noise level (dBm) | −78 | −78 | −78 | −78 | −78 |
| | C/N ratio | 56 | 56 | 56 | 56 | 56 |
| Ex. 3-2 | Noise level (dBm) | −78 | −78 | −78 | −78 | −78 |
| | C/N ratio | 56 | 56 | 56 | 55 | 56 |
| Ex. 3-3 | Noise level (dBm) | −79 | −79 | −79 | −79 | −79 |
| | C/N ratio | 57 | 57 | 57 | 57 | 57 |
| Ex. 3-4 | Noise level (dBm) | −78 | −78 | −78 | −78 | −78 |
| | C/N ratio | 57 | 57 | 57 | 57 | 57 |
| Ex. 3-5 | Noise level (dBm) | −78 | −78 | −78 | −78 | −78 |
| | C/N ratio | 55 | 55 | 55 | 55 | 55 |

Comparative Examples 3–1 and 3–2

Another 200 optical cards of Examples 3–1 and 3–2 were prepared in the same manner as Example 3–1 except using the compounds Nos. (201) and (202), respectively, instead of compound No. (2), to measure and evaluate the noise levels and the C/N ratios of the optical cards No. 1, No. 10, No. 50, No. 100 and No. 200.

The results are shown in Table 7–2.

Reference Example 1

Other 200 optical cards were prepared in the same manner as Example 3–1 except using for the compound No. (3) instead of the compound No. (2), to measure and evaluate the noise levels and the C/N ratios of the optical cards No. 1, No. 10, No. 50, No. 100 and No. 200.

The results are also shown in Table 7-2 below.

TABLE 7-2

| | | Optical card No. | | | | |
|---|---|---|---|---|---|---|
| | | No. 1 | No. 10 | No. 50 | No. 100 | No. 200 |
| CEx. 3-1 | Noise level (dBm) | −75 | −75 | −73 | −73 | −70 |
| | C/N ratio | 50 | 50 | 48 | 47 | 45 |
| CEx. 3-2 | Noise level (dBm) | −76 | −76 | −75 | −74 | −71 |
| | C/N ratio | 54 | 54 | 53 | 53 | 50 |
| REx. 1 | Noise level (dBm) | −74 | −74 | −73 | −73 | −72 |
| | C/N ratio | 52 | 52 | 51 | 51 | 50 |

Apparently from the Tables 7-1 and 7-2, the changing ratio of the noise level between the optical cards No. 1 and No.200 was zero in Examples 3–1 to 3–5, whereas It Increased as much as 6.7% in Comparative Example 3–1 and Increased 6.6% in Comparative Example 3–2. On the other hand, it increased 2.7% in Reference Example 1 as well.

The reason for this is assumed to be because the polymethine coloring matter compounds used in Comparative Examples 3–1 and 3–2 and Reference Example 1 have Insufficient solubilities in the solvents and are easily precipitated as solid matters such as crystallites even by a slight change of concentrations of the coating solution in the coating process on the plural substrates, resulting in noises. On the other hand the polymethine compounds of the present invention used in Examples 3–1 to 3–5 have high solubilities in the solvents which may not attack the plastics, and are hardly precipitated even by some degree of change of concentrations in the coating process, resulting in less contamination of their crystals in the recording layer. Consequently, it is considered that the optical recording medium having a constant low noise level can be obtained by using such polymethine compounds.

Example 4–1

The optical card was prepared in the same manner as Example 2–1 except for using the coating solution for the recording layer in which 2.4 parts by weight of the polymethine coloring matter compound No.(1) and 0.6 part by weight of the stabilizer represented by the structural formula below were mixed with 97 parts by weight of diacetone alcohol, to measure for the initial transmittance and the transmittance obtained after the fade meter light resistance test (for 100 hours). The results are shown in Table 8 below.

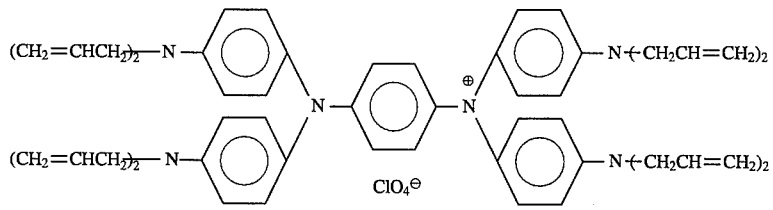

TABLE 8

|  | Initial transmittance | Transmittance after fade meter light resistance test (100 hours) |
|---|---|---|
| Ex. 4-1 | 21.0% | 23.0% |

While the present invention has been described with respect to what is presently considered to be the preferred embodiments. It is to be understood that the invention is not limited to the disclosed embodiments. To the contrary, the invention is intended to cover various modifications and equivalent arrangements included within the spirit and scope of the appended claims.

What is claimed is:

1. An optical recording medium comprising a substrate and a recording layer on said substrate, said recording layer containing an organic coloring matter expressed by the following formula (I):

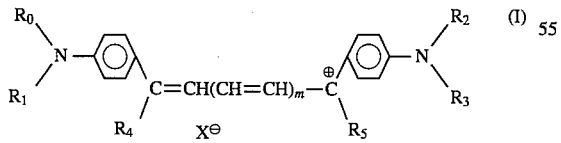

wherein $R_0$ through $R_5$ each indicate a hydrogen atom or an monovalent organic residue, wherein at least one of $R_4$ and $R_5$ is a monovalent organic residue and at least one of $R_0$ through $R_3$ is a fluorine-containing monovalent organic residue; m indicates 0, 1 or 2; and $X^\ominus$ indicates an anion residue, and wherein the number of fluorine atoms of said fluorine monovalent organic residue is 0.17 n to 3 n relative to the number n of carbon atoms thereof.

2. An optical recording medium according to claim 1, wherein said fluorine-containing monovalent organic residue is a fluorine-containing substituted or unsubstituted alkyl group, a fluorine-containing substituted or unsubstituted alkenyl group, a fluorine-containing substituted or unsubstituted aralkyl group, or a fluorine-containing substituted or unsubstituted aryl group, wherein said fluorine-containing unsubstituted alkyl group includes fluoromethyl, difluoromethyl, trifluoromethyl, 1-fluoroethyl, 2-fluoroethyl, 1,1-difluoroethyl, 1,2-difluoroethyl, 2,2-difluoroethyl, 1,1,1-trifluoroethyl, 1,1,2-trifluoroethyl 1,2,2-trifluoroethyl, 1,1,2,2-tetrafluoroethyl, 1,1,1,2-tetrafluoroethyl, pentafluoroethyl, 1-fluoropropyl, 2-fluoropropyl, 3-fluoropropyl, 1,1-difluoropropyl, 1,2-difluoropropyl, 1,3-difluoropropyl, 2,2-difluoropropyl, 2,3-difluoropropyl, 3,3-difluoropropyl, 1,1,2-trifluoropropyl, 1,1,3-trifluoropropyl, 1,2,2-trifluoropropyl, 1,2,3-trifluoropropyl, 1,3,3-trifluoropropyl, 2,2,3-trifluoropropyl, 3,3,3-trifluoropropyl, 1,1,2,2-tetrafluoropropyl, 1,1,3,3-tetrafluoropropyl, 1,1,2,3-tetrafluoropropyl, 1,2,2,3-tetrafluoropropyl, 1,2,3,3-tetrafluoropropyl, 2,2,3,3-tetrafluoropropyl, 1,3,3,3-tetrafluoropropyl, 2,3,3,3-tetrafluoropropyl 1,1,2,2,3-pentafluoropropyl, 1,1,2,3,3-pentafluoropropyl, 1,1,3,3,3-pentafluoropropyl, 1,2,2,3,3-pentafluoropropyl, 1,2,3,3,3-pentafluoropropyl, 2,2,3,3,3-pentafluoropropyl, 1,1,2,2,3,3-hexafluoropropyl, 1,1,2,3,3,3-hexafluoropropyl, 1,2,2,3,3,3-hexafluoropropyl, heptafluoropropyl, 1,1,1,3,3,3-hexafluoro-2-propyl, heptafluoro-2-propyl, 2,2-difluorobutyl, 2,2,3,3-tetrafluorobutyl, 4,4,4-trifluorobutyl, 3,3,4,4,4-pentafluorobutyl, 2,2,4,4,4-pentafluorobutyl, 2,2,3,4,4,4-hexafluorobutyl, 1,2,3,4-tetrafluorobutyl, nonafluorobutyl, 2,2,3,3,4,4,4-heptafluoro-2-butyl, -nonafluorobutyl, 5,5,5-trifluoropentyl, 4,4,5,5,5-pentafluoropentyl, 3,3,5,5,5-pentafluoropentyl, 3,3,4,4-tetrafluoropentyl, 1,2,3,4,5-pentafluoropentyl, 2,2,3,3,4,4,5,5-octafluoropentyl, 6,6,6-trifluorohexyl, 6,6,7,7,7-pentafluorohexyl, 8,8,8-trifluorooctyl, and 5,5,6,6,7,7,8,8-octafluorooctyl groups;

wherein said fluorine-containing substituted alkyl groups include fluorine-containing hydroxyalkyl groups selected form the group consisting of 2-hydroxy-2-fluoroethyl, 2-hydroxy-1,1-difluoroethyl, and 3-hydroxy-2,2-difluoropropyl groups; fluorine-containing acetoxyalkyl groups selected form the group consisting of 2-acetoxy-2-fluoroethyl, 2-acetoxy-2,2-difluoroethyl, and 3-acetoxy- 2,2,3,3-tetrafluoropropyl groups; fluorine-containing carboxyalkyl groups selected form the group consisting of 2-carboxy-1,2-difluoroethyl, 3-carboxy- 3-fluoropropyl, and 4-carboxy-2,2-difluorobutyl groups; fluorine-containing alkoxyalkyl groups selected form the group consisting of trifluoromethoxymethyl, trifluoromethyoxyethyl, trifluoromethoxy-2-difluoroethyl, difluoromethoxyethyl, 2-trifluoroethoxy- 2'-difluoroethyl, trifluoromethoxy-n-propyl, pentafluoroethoxyethyl, pentafluoroethoxypropyl, methoxy-3,3-difluoropropyl, and trifluoromethoxyaotyl groups;

wherein said fluorine-containing unsubstituted alkenyl groups include trifluoroethylene, 2,2-difluoroethylene, pentafluoropropenyl, pentafluorobutenyl groups;

wherein said fluorine-containing substituted alkenyl groups include a 2-hydroxy-3,3-difluoropropenyl group;

wherein said fluorine-containing unsubstituted aralkyl groups include p-fluorobenzyl, m-fluorobenzyl, pentafluorobenzyl, p-trifluoromethylbenzyl, 1-(pentafluorophenyl)ethyl, and 3-(pentafluorophenyl)propyl groups;

wherein said fluorine-containing substituted aralkyl groups include a 4-hydroxy-3-fluorobenzyl group;

wherein said fluorine-containing unsaturated aryl groups include p-fluorophenyl, and pentafluorophenyl groups; and wherein said fluorine-containing substituted aryl groups include p-trifluoromethylphenyl, and 3,5-bis(trifluoromethyl)phenyl groups and the like.

3. An optical recording medium according to claim 2, wherein said fluorine-containing monovalent organic residue is said fluorine-containing substituted or unsubstituted alkyl group.

4. An optical recording medium according to claim 1, wherein the number of fluorine atoms of said fluorine-containing monovalent organic residue is 0.5 n to 1.8 n relative to the number n of carbon atoms thereof.

5. An optical recording medium according to claim 1, wherein at least one of $R_0$ and $R_1$, and at least one of $R_2$ and $R_3$ are fluorine-containing monovalent organic residues.

6. An optical recording medium according to claim 5, wherein $R_0$ through $R_3$ are all fluorine-containing monovalent organic residues.

7. An optical recording medium according to claim 1, wherein $R_4$ and $R_5$ are each a monovalent organic residue having no fluorine atom, and at least one of $R_4$ and $R_5$ is a substituted or unsubstituted aryl group, wherein said unsubstituted aryl group includes phenyl, naphthyl, tolyl, xylyl, and wherein said substituted aryl groups include methoxyphenyl, dimethoxyphenyl, trimethoxyphenyl, ethoxyphenyl, dimethylaminophenyl, diethylaminophenyl, dipropylaminophenyl, dibenzylaminophenyl, diphenylaminophenyl, and ditolylaminophenyl groups.

8. An optical recording medium according to claim 1, wherein at least one of $R_4$ and $R_5$ is an amino-substituted aryl group expressed by the following formula (III):

(III)

wherein $R_6$ and $R_7$ are each a hydrogen atom or a monovalent organic residue, and at least one of $R_6$ and $R_7$ is a fluorine-containing methyl or ethyl group.

9. An optical recording medium comprising a substrate and a recording layer on said substrate, said recording layer containing an organic coloring matter expressed by the following formula (II):

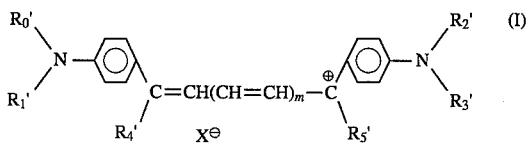

(I)

wherein $X^\ominus$ indicates an anion residue; m indicates 0, 1 or 2; and $R'_0$ through $R'_3$ are atoms forming combinations of $R'_0$ and $R'_1$, and $R'_2$ and $R'_3$ at least one of which forms, with a nitrogen atoms, a fluorine-containing substituted or unsubstituted pyrrolidine ring, a fluorine-containing substituted or unsubstituted piperidine ring, a fluorine-containing substituted or unsubstituted morpholine ring, a fluorine-containing substituted or unsubstituted tetrahydropyridine ring, a fluorine-containing substituted or unsubstituted cyclohexylamine ring expressed by the formula:

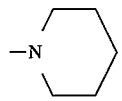

and the other substituents each being a hydrogen atom or a monovalent organic residue; and $R'_4$ and $R'_5$ each indicate a hydrogen atom or a monovalent organic residue, wherein said pyrrolidine ring is substituted with a methyl group in which at least one of the hydrogen atoms is substituted with a fluorine atom, wherein said piperidine ring is substituted with a methyl group in which at least one of the hydrogen atoms is substituted with a fluorine group; wherein said morpholine ring is substituted with a methyl group in which at least one of the hydrogen atoms is substituted with a fluorine atom, wherein said tetrahydropyridine ring is substituted with a fluorine atom, and when said cyclohexamine ring is substituted by a methyl group in which at least one of the hydrogen atoms is substituted with a fluorine atom.

10. An optical recording medium according to claim 9, wherein $R'_4$ and $R'_5$ are each a monovalent organic residue having no fluorine atom, and at least one of $R'_4$ and $R'_5$ is said substituted aryl group.

11. An optical recording medium according to claim 10, wherein at least one of $R_{4'}$ and $R_{5'}$ is an amino-substituted aryl group expressed by the following formula (IV):

(IV)

wherein $R_{6'}$ and $R_{7'}$ are each a hydrogen atom or a monovalent organic residue, and at least one of $R_{6'}$ and $R_{7'}$ is a fluorine-containing methyl or ethyl group.

12. An optical recording medium according to claim 10, wherein at least one of $R_{4'}$ and $R_{5'}$ is an amino-substituted aryl group expressed by the following formula (V):

(V)

wherein $R_{8'}$ and $R_{9'}$ indicate atoms required for forming in a combination of $R_{8'}$ and $R_{9'}$, with a nitrogen atom, a pyrrolidine ring substituted with a methyl group in which at least one of the hydrogen atoms is substituted by a fluorine atom/a piperidine ring substituted with a methyl group in which at least one of the hydrogen atoms is substituted by a fluorine atom, a morpholine ring substituted with a methyl group in which at least one of the hydrogen atoms is substituted by a fluorine atom, a tetrahydropyridine ring substituted with a methyl group in which at least one of the hydrogen atoms is substituted by a fluorine atom, or a cyclohexylamine ring substituted with a methyl group in which at least one of the hydrogen atoms is substituted by a fluorine atom.

13. A method of producing an optical recording medium comprising a substrate and a recording layer on said substrate, said recording layer containing an organic coloring matter, said method comprising the step of forming said recording layer on a substrate by coating a solution containing said organic coloring matter expressed by the following formula (I) on said substrate

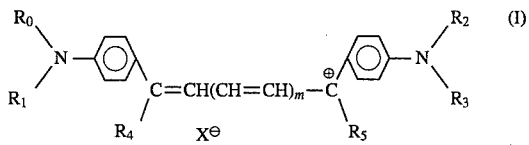

wherein $R_0$ through $R_5$ each indicate a hydrogen atom or an monovalent organic residue, at least one of $R_0$ through $R_3$ being a fluorine-containing monovalent organic residue; m indicates 0, 1 or 2; and $X^\ominus$ indicates an anion residue and wherein the number of fluorine atoms of said fluorine monovalent organic residue is 0.17n to 3n relative to the number n of carbon atoms thereof.

14. A method of producing an optical recording medium comprising a substrate and a recording layer on said substrate, said recording layer containing an organic coloring matter, said method comprising the step of forming said recording layer on a substrate by coating a coating solution containing said organic coloring matter expressed by the following formula (II) on said substrate:

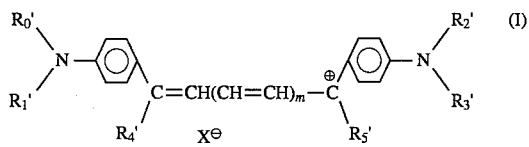

wherein $X^\ominus$ indicates an anion residue; m indicates 0, 1 or 2; and $R'_0$ and $R'_3$ are atoms forming combinations of $R'_0$ and $R'_1$, and $R'_2$ and $R'_3$ at least one of which forms, with a nitrogen atom, a fluorine-containing substituted or unsubstituted pyrrolidine ring, a fluorine-containing substituted or unsubstituted piperidine ring, a fluorine-containing substituted or unsubstituted morpholine ring, a fluorine-containing substituted or unsubstituted tetrahydropyridine ring, a fluorine-containing substituted or unsubstituted cyclohexylamine ring expressed by the formula:

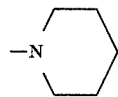

and the other substituents each being a hydrogen atom or a monovalent organic residue; and $R'_4$ and $R'_5$ each indicate a hydrogen atom or a monovalent organic residue, wherein said pyrrolidine ring is substituted with a methyl group in which at least one of the hydrogen atoms is substituted with a fluorine atom, wherein said piperidine ring is substituted with a methyl group in which at least one of the hydrogen atoms is substituted with a fluorine group; wherein said morpholine ring is substituted with a methyl group in which at least one of the hydrogen atoms is substituted with a fluorine atom, wherein said tetrahydropyridine ring is substituted with a fluorine atom, and when said cyclohexamine ring is substituted by a methyl group in which at least one of the hydrogen atoms is substituted with a fluorine atom.

15. An optical recording medium comprising a substrate and a recording layer on said substrate, said recording layer containing an organic coloring matter expressed by the following formula (I):

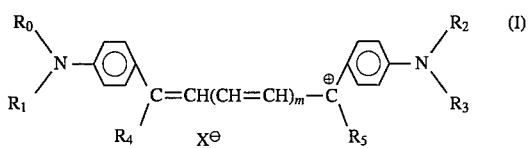

wherein $R_0$ through $R_5$ each indicate a hydrogen atom or an monovalent organic residue, wherein at least one of $R_4$ and $R_5$ is a monovalent organic residue and at least one of $R_0$ through $R_3$ is a fluorine-containing monovalent organic residue; m indicates 0, 1 or 2; and $X^\ominus$ indicates an anion residue, and wherein the number of fluorine atoms of said fluorine monovalent organic residue is 0.17 n to 3 n relative to the number n of carbon atoms thereof, wherein said fluorine-containing monovalent organic residue is a fluorine-containing substituted or unsubstituted alkyl group, wherein said unsubstituted alkyl group includes fluoromethyl, difluoromethyl, trifluoromethyl, 1-fluoroethyl, 2-fluoroethyl, 1,1-difluoroethyl, 1,2-difluoroethyl, 2,2-difluoroethyl, 1,1,1-trifluoroethyl, 1,1,2-trifluoroethyl, 1,2,2-trifluoroethyl, 1,1,2,2-tetrafluoroethyl, 1,1,1,2-tetrafluoroethyl, pentafluoroethyl, 1-fluoropropyl, 2-fluoropropyl, 3-fluoropropyl, 1,1-difluoropropyl, 1,2-difluoropropyl, 1,3-difluoropropyl, 2,2-difluoropropyl, 2,3-difluoropropyl, 3,3-difluoropropyl, 1,1,2-trifluoropropyl, 1,1,3-trifluoropropyl, 1,2,2-trifluoropropyl, 1,2,3-trifluoropropyl, 1,3,3-trifluoropropyl, 2,2,3-trifluoropropyl, 3,3,3-trifluoropropyl, 1,1,2,2-tetrafluoropropyl, 1,1,3,3-tetrafluoropropyl, 1,1,2,3-tetrafluoropropyl 1,2,2,3-tetrafluoropropyl, 1,2,3,3-tetrafluoropropyl, 2,2,3,3-tetrafluoropropyl, 1,3,3,3-tetrafluoropropyl 2,3,3,3-tetrafluoropropyl, 1,1,2,2,3-pentafluoropropyl 1,1,2,3,3-pentafluoropropyl, 1,1,3,3,3-pentafluoropropyl, 1,2,2,3,3-pentafluoropropyl, 1,2,3,3,3-pentafluoropropyl, 2,2,3,3,3-pentafluoropropyl, 1,1,2,2,3,3-hexafluoropropyl, 1,1,2,3,3,3-hexafluoropropyl, 1,2,2,3,3, 3hexafluoropropyl, heptafluoropropyl, 1,1,1,3,3,3-hexafluoro- 2-propyl, heptafluoro-2-propyl, 2,2-difluorobutyl, 2,2,3,3-tetrafluorobutyl, 4,4,4-trifluorobutyl, 3,3,4,4,4-pentafluorobutyl, 2,2,4,4,4-pentafluorobutyl, 2,2,3,4,4,4-hexafluorobutyl, 1,2,3,4-tetrafluorobutyl, nonafluorobutyl, 2,2,3,3,4,4,4-heptafluoro-2-butyl, t-nonafluorobutyl, 5,5,5-trifluoropentyl, 4,4,5,5,5-pentafluoropentyl, 3,3,5,5,5-pentafluoropentyl, 3,3,4,4-tetrafluoropentyl, 1,2,3,4,5-pentafluoropentyl, 2,2,3,3,4,4,5,5-octafluoropentyl, 6,6,6-trifluorohexyl, 6,6,7,7,7-pentafluoropentyl, 8,8,8-trifluorooctyl, and 5,5,6,6,7,7,8,8-octafluorooctyl groups, and wherein said fluorine-containing substituted alkyl groups include fluorine-containing hydroxyalkyl groups selected form the group consisting of 2-hydroxy-2-fluoroethyl, 2-hydroxy-1,1-difluoroethyl, and 3-hydroxy-2,2-difluoropropyl groups; fluorine-containing acetoxyalkyl groups selected form the group consisting of 2-acetoxy-2-fluoroethyl, 2-acetoxy-2,2-difluoroethyl, and 3-acetoxy- 2,2,3,3-tetrafluoropropyl groups; fluorine-containing carboxyalkyl groups selected from the groups consisting of 2-carboxy-1,2-difluoroethyl, carboxy-3-fluoropropyl, and 4-carboxy-2,2-difluorobutyl groups; fluorine-containing alkoxyalkyl groups selected form the group consisting of trifluoromethoxymethyl, trifluoromethyoxyethyl, trifluoromethoxy-2-difluoroethyl, difluoromethoxyethyl, 2-trifluoroethoxy- 2'-difluoroethyl, trifluoromethoxy-n-propyl, pentafluoroethoxyethyl, pentafluoroethoxypropyl, methoxy-3,3-difluoropropyl, and trifluoromethoxyaotyl groups.

16. An optical recording medium comprising a substrate and a recording layer on said substrate, said recording layer containing an organic coloring matter expressed by the following formula (I):

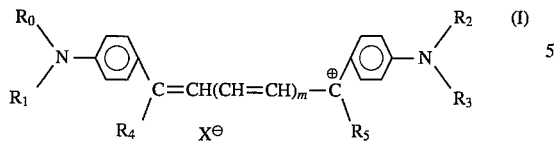

wherein $R_0$ through $R_5$ each indicate a hydrogen atom or an monovalent organic residue, wherein at least one of $R_4$ and $R_5$ is a monovalent organic residue and at least one of $R_0$ through $R_3$ is a fluorine-containing monovalent organic residue; m indicates 0, 1 or 2; and $X^\ominus$ indicates an anion residue, and wherein the number of fluorine atoms of said fluorine monovalent organic residue is 0.17 n to 3 n relative to the number n of carbon atoms thereof, and wherein at least one of $R_4$ and $R_5$ is an amino-substituted aryl group expressed by the following formula (III):

wherein $R_6$ and $R_7$ are each a hydrogen atom or a monovalent organic residue, and at least one of $R_6$ and $R_7$ is a fluorine-containing methyl or ethyl group.

* * * * *

UNITED STATES PATENT AND TRADEMARK OFFICE
CERTIFICATE OF CORRECTION

PATENT NO. : 5,492,792
DATED : February 20, 1996
INVENTOR(S) : MIKI TAMURA ET AL.

It is certified that error appears in the above-identified patent and that said Letters Patent is hereby corrected as shown below:

On the title page,
item [57] ABSTRACT

Line 4, "an" should read --a--.
    Line 19, "$R_4$, and $R_5$," should read --$R_4$, and $R_5$,--.

COLUMN 1

Line 11, "relates" should read --relates to--.
    Line 17, "pits:" should read --pits--.
    Line 26, "in" should read --of--.

COLUMN 3

Line 52, "invent ion;" should read --invention;--.
    Line 58, "invent ion;" should read --invention;--.

COLUMN 4

Line 31, ""substituted" should read --"Substituted--.

COLUMN 5

Line 52, "5" should be deleted.

COLUMN 10

Line 14, "be low." should read --below.--.

UNITED STATES PATENT AND TRADEMARK OFFICE
CERTIFICATE OF CORRECTION

PATENT NO. : 5,492,792
DATED : February 20, 1996
INVENTOR(S) : MIKI TAMURA ET AL.

Page 2 of 6

It is certified that error appears in the above-identified patent and that said Letters Patent is hereby corrected as shown below:

COLUMN 15

Table 1-1-continued, Ex. (18), "$(-(CF_3)_3CF_3, -(CF_3)_3CF_3)$" should read --$(-(CF_2)_3CF_3, -(CF_2)_3CF_3)$--.
Table 1-1-continued, Ex. (19), "$(-CH_2CHF_2, -CH_2CH_2)$" should read --$(-CH_2CHF_2, -CH_2CHF_2)$--.

COLUMN 20

Table 1-1-continued, Ex. (39), "$CiO_4$" should read --$ClO_4$--.
Table 1-1-continued, Ex. (40), "$(-C_2C_4OCF_3, -C_2H_4OCF_3)$" should read --$(-C_2H_4OCF_3, -C_2H_4OCF_3)$--.

COLUMN 27

Line 38, "relfectance," should read --reflectance,--.

COLUMN 29

Line 12, "1800," should read --1800--.
Line 67, "evaluated" should read --evaluated for--.

UNITED STATES PATENT AND TRADEMARK OFFICE
CERTIFICATE OF CORRECTION

PATENT NO. : 5,492,792
DATED : February 20, 1996
INVENTOR(S) : MIKI TAMURA ET AL.

It is certified that error appears in the above-identified patent and that said Letters Patent is hereby corrected as shown below:

COLUMN 30

Line 61, "Instead" should read --instead--.
Line 65, "evaluated" should read --evaluated for-- and "for" should be deleted.

COLUMN 33

Line 56, "Information" should read --information--.

COLUMN 34

Line 9, "Information" should read --information--.
Line 39, "Examples 2-1." should read --Examples 2-1--.

COLUMN 35

Line 36, "th" should read --200th--.
Line 51, "60m m/sec." should read --60mm/sec.-.
Line 54, "Information" should read --information--.

COLUMN 36

Line 57, "It" should read --it--.
Line 58, "Increased" should read --increased--.
Line 59, "Increased" should read --increased--.
Line 66, "Insufficient" should read --insufficient--.

COLUMN 37

Line 60, "an" should read --a--.

UNITED STATES PATENT AND TRADEMARK OFFICE
CERTIFICATE OF CORRECTION

PATENT NO. : 5,492,792
DATED : February 20, 1996
INVENTOR(S) : MIKI TAMURA ET AL.

It is certified that error appears in the above-identified patent and that said Letters Patent is hereby corrected as shown below:

COLUMN 38

Line 42, "-nonafluorobutyl," should read --t-nonafluorobutyl,--.
Line 51, "form" should read --from--.
Line 54, "form" should read --from--.
Line 57, "form" should read --from--.
Line 61, "form" should read --from--.

COLUMN 39

Line 19, "groups and the like." should read --groups.--.
Line 60, "(I)" should read --(II)--.
Line 67, "R'$_0$ through R'$_3$" should read --R$_0$, through R$_3$,--.

COLUMN 40

Line 1, "R'$_0$ and R'$_1$, and R'$_2$ and R'$_3$" should read --R$_0$, and R$_1$,, and R$_2$, and R$_3$,--.
Line 2, "atoms," should read --atom,--.
Line 15, "R'$_4$ and R'$_5$" should read --R$_4$, and R$_5$,--.
Line 29, "R'$_4$ and R'$_5$" should read --R$_4$, and R$_5$,--.
Line 30, "R'$_4$ and R'$_5$" should read --R$_4$, and R$_5$,--.
Line 55, "atom/a" should read --atom, a--.

UNITED STATES PATENT AND TRADEMARK OFFICE
CERTIFICATE OF CORRECTION

PATENT NO. : 5,492,792
DATED : February 20, 1996
INVENTOR(S) : MIKI TAMURA ET AL.

It is certified that error appears in the above-identified patent and that said Letters Patent is hereby corrected as shown below:

COLUMN 41

Line 4, "substrate" should read --substrate:--.
Line 12, "an" should read --a--.
Line 27, "(I)" should read --(II)--.
Line 34, "R'$_0$ and R'$_3$" should read --R$_0$, and R$_3$,-- and "R'$_0$" should read --R$_0$,--.
Line 35, "R'$_1$, and R'$_2$ and R'$_3$" should read --R$_1$,, and R$_2$, and R$_3$,--.
Line 50, "R'$_4$ and R'$_5$" should read --R$_4$, and R$_5$,--.

COLUMN 42

Line 7, "an" should read --a--.
Line 34, "3hexafluoropropyl," should read --3-hexafluoropropyl,--.
Line 48, "form" should read --from--.
Line 52, "form" should read --from--.
Line 57, "carboxy-3-fluoropropyl," should read --3-carboxy-3-fluoropropyl,--.
Line 59, "form" should read --from--.

UNITED STATES PATENT AND TRADEMARK OFFICE
CERTIFICATE OF CORRECTION

PATENT NO. : 5,492,792
DATED : February 20, 1996
INVENTOR(S) : MIKI TAMURA ET AL.

Page 6 of 6

It is certified that error appears in the above-identified patent and that said Letters Patent is hereby corrected as shown below:

COLUMN 43

Line 9, "an" should read --a--.

Signed and Sealed this

First Day of October, 1996

Attest:

BRUCE LEHMAN

Attesting Officer    Commissioner of Patents and Trademarks